(12) United States Patent
Yajima et al.

(10) Patent No.: US 6,481,229 B1
(45) Date of Patent: Nov. 19, 2002

(54) REFRIGERATING DEVICE

(75) Inventors: Ryuzaburo Yajima, Osaka (JP); Nobuo Domyo, Osaka (JP); Shigeharu Taira, Shiga (JP); Hajime Esumi, Osaka (JP); Kazuyuki Nishikawa, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/787,251

(22) PCT Filed: Jul. 14, 2000

(86) PCT No.: PCT/JP00/04735
§ 371 (c)(1),
(2), (4) Date: Mar. 15, 2001

(87) PCT Pub. No.: WO01/06186
PCT Pub. Date: Jan. 25, 2001

(30) Foreign Application Priority Data

Jul. 15, 1999 (JP) .......................................... 11-201823

(51) Int. Cl.⁷ ................................................. F25B 41/04
(52) U.S. Cl. ........................... 62/225; 236/84; 236/92 B
(58) Field of Search ................ 62/225, 224; 236/92 B, 236/84

(56) References Cited

U.S. PATENT DOCUMENTS

| | | | | |
|---|---|---|---|---|
| 4,448,038 A | * | 5/1984 | Barbier | ........................ 62/212 |
| 4,459,819 A | * | 7/1984 | Hargraves | .............. 251/129.08 |
| 4,523,435 A | * | 6/1985 | Lord | ........................ 236/78 D |
| 4,735,060 A | * | 4/1988 | Alsenz | ........................ 62/212 |
| 6,044,655 A | * | 4/2000 | Ozaki et al. | ................... 62/205 |

FOREIGN PATENT DOCUMENTS

| | | |
|---|---|---|
| EP | 0645563 | 6/1994 |
| JP | 62-93479 | 6/1987 |
| JP | 6-81975 | 3/1994 |
| JP | 8-189735 | 7/1996 |
| WO | WO 95/14186 | 5/1995 |

* cited by examiner

Primary Examiner—William E. Tapolcai
(74) Attorney, Agent, or Firm—Nixon Peabody LLP; Donald R. Studebaker

(57) ABSTRACT

The present invention provides means for selecting a direct drive type electrically driven expansion valve (Z). The present invention includes a compressor (121), an external heat exchanger (123), a direct drive type electrically driven expansion valve (Z), and an internal heat exchanger (131). The rating torque equivalent friction factor E of the direct drive type electrically driven expansion valve (Z) is set to 0.31 or more.

84 Claims, 7 Drawing Sheets

REFRIGERATING DEVICE

TECHNICAL FIELD

The present invention relates to a refrigerating apparatus, in particular, a refrigerating apparatus provided with a direct drive type electrically driven expansion valve.

BACKGROUND ART

Conventionally, various refrigerating apparatuses including an air conditioner have been provided with a refrigerant circuit including a compressor, a four path switching valve, an external heat exchanger, an expansion valve, and an internal heat exchanger that are connected sequentially in this order, as disclosed in Japanese Laid-Open Patent Publication No. 8-189735. As the expansion valve, a direct drive type electrically driven expansion valve is used.

As the direct drive type electrically driven expansion valve in the refrigerating apparatus, a direct drive type electrically driven expansion valve having a predetermined rating torque corresponding to the operational ability, that is the horsepower, has been selected only empirically. Moreover, there has been no consideration about the phenomenon that sludge generated by a refrigerant that contains no chlorine is attached to the driving portion of an electrically driven expansion valve and inhibits the driving, and a necessary torque is determined without considering sludge, and an electrically driven expansion valve having that torque is simply attached.

However, this may cause a problem that the expansion valve cannot reliably be opened or closed under the condition that sludge is generated.

Furthermore, when a predetermined torque is set to be too large a value for safety on the other hand, although there is no problem on opening or closing of the electrically driven expansion valve, the expansion valve has a larger capacity than necessary, which leads to wastefulness.

In view of the above-problems, it is an object of the present invention to provide a novel method for selecting a direct drive type electrically driven expansion valve.

DISCLOSURE OF INVENTION

In the present invention, a direct drive type electrically driven expansion valve is set by using the friction factor as the parameter. In other words, the inventors of the present invention examined the conditions for driving the direct drive type electrically driven expansion valve in detail, and discovered that the friction in a thread portion is varied significantly depending on the driving conditions. Then, they made research and found that attachment of sludge is varied with the refrigerant temperature, and the friction factor is varied. Thus, the direct drive type electrically driven expansion valve is set based on the friction factor on the thread surface at the rating torque (the rating torque equivalent friction factor E in the present invention).

More specifically, a first refrigerating apparatus of the present invention includes a low pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant based on HFC is used, and a rating torque equivalent friction factor E of the direct drive type Eelectrically driven expansion valve (Z) is set to 0.31 or more and less than 0.62.

A second refrigerating apparatus of, the present invention includes a high pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant having a discharge temperature in the same level as that of R22 or higher is used, and a rating torque equivalent friction factor E of the direct drive type electrically driven expansion valve (Z) is set to 0.34 or more and less than 0.68.

A third refrigerating apparatus of the present invention includes a high pressure dome type compressor (121), a direct drive type electrically driven expansion valve (Z), and a heat source side heat exchanger (123) and a heat application side heat exchanger (131), the heat source side heat exchanger (123) and the heat application side heat exchanger (131) corresponding to each other one-to-one, wherein a refrigerant of R32 alone or a R32 rich mixture comprising an amount of more than 50 wt % of R32 is used, and a rating torque equivalent friction factor E of the direct drive type electrically driven expansion valve (Z) is set to 0.37 or more and less than 0.74.

A fourth refrigerating apparatus of the present invention includes a high pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a R32 rich mixture refrigerant having a discharge temperature of more than about 10° C. higher than that of R22 is used, and a rating torque equivalent friction factor E of the direct drive type electrically driven expansion valve (Z) is set to 0.37 or more and less than 0.74.

A fifth refrigerating apparatus of the present invention includes a high pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant based on HFC is used, and a rating torque equivalent friction factor E of the direct drive type electrically driven expansion valve (Z) is set to 0.37 or more and less than 0.74.

A sixth refrigerating apparatus of the present invention includes a low pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant based on HFC is used, and a rating torque equivalent friction factor E of the direct drive type electrically driven expansion valve (Z) is set to 0.62 or more and less than 0.93.

A seventh refrigerating apparatus of the present invention includes a high pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant having a discharge temperature in the same level as that of R22 or higher is used, and a rating torque equivalent friction factor E of the direct drive type electrically driven expansion valve (Z) is set to 0.68 or more and less than 1.02.

An eighth refrigerating apparatus of the present invention includes a high pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant of R32 alone or a R32 rich mixture comprising an amount of more than 50 wt % of R32 is used, and a rating torque equivalent friction factor E of the direct drive type electrically driven expansion valve (Z) is set to 0.74 or more and less than 1.11.

A ninth refrigerating apparatus of the present invention includes a high pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a R32 rich mixture refrigerant having a discharge temperature of more than about 10° C. higher than that of R22 is used, and a rating torque equivalent friction factor E of the direct drive type electrically driven expansion valve (Z) is set to 0.74 or more and less than 1.11.

A tenth refrigerating apparatus of the present invention includes a high pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant based on HFC is used, and a rating torque equivalent friction factor E of the direct drive type electrically driven expansion valve (Z) is set to 0.74 or more and less than 1.11.

An eleventh refrigerating apparatus of the present invention includes a low pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant based on HFC is used, and a rating torque equivalent friction factor E of the direct drive type electrically driven expansion valve (Z) is set to 0.93 or more.

A twelfth refrigerating apparatus of the present invention includes a high pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant having a discharge temperature in the same level as that of R22 or higher is used, and a rating torque equivalent friction factor E of the direct drive type electrically driven expansion valve (Z) is set to 1.02 or more.

A thirteenth refrigerating apparatus of the present invention includes a high pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant of R32 alone or a R32 rich mixture comprising an amount of more than 50 wt % of R32 is used, and a rating torque equivalent friction factor E of the direct drive type electrically driven expansion valve (Z) is set to 1.11 or more.

A fourteenth refrigerating apparatus of the present invention includes a high pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a R32 rich mixture refrigerant having a discharge temperature of more than about 10° C. higher than that of R22 is used, and a rating torque equivalent friction factor E of the direct drive type electrically driven expansion valve (Z) is set to 1.11 or more.

A fifteenth refrigerating apparatus of the present invention includes a high pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant based on HFC is used, and a rating torque equivalent friction factor E of the direct drive type electrically driven expansion valve (Z) is set to 1.11 or more.

A sixteenth refrigerating apparatus of the present invention includes a low pressure dome type compressor (121), a direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers, wherein a refrigerant based on HFC is used, and a rating torque equivalent friction factor E of the direct drive type electrically driven expansion valve (Z) is set to 0.33 or more and less than 0.66.

A seventeenth refrigerating apparatus of the present invention includes a high pressure dome type compressor (121), a direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers, wherein a refrigerant having a discharge temperature in the same level as that of R22 or higher is used, and a rating torque equivalent friction factor E of the direct drive type electrically driven expansion valve (Z) is set to 0.40 or more and less than 0.80.

An eighteenth refrigerating apparatus of the present invention includes a high pressure dome type compressor (121), a direct drive type electrically driven expansion valve (Z), a heat source side heat exchanger (123) and a heat application side heat exchanger (131), one or both of which are constituted by a plurality of heat exchangers, wherein a refrigerant of R32 alone or a R32 rich mixture comprising an amount of more than 50 wt % of R32 is used, the rating torque equivalent friction factor E of the direct drive type electrically driven expansion valve (Z) is set to 0.47 or more and less than 0.94.

A nineteenth refrigerating apparatus of the present invention includes a high pressure dome type compressor (121), the direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers, wherein a R32 rich mixture refrigerant having a discharge temperature of more than about 10° C. higher than that of R22 is used, and a rating torque equivalent friction factor E of the direct drive type electrically driven expansion valve (Z) is set to 0.47 or more and less than 0.94.

A twentieth refrigerating apparatus of the present invention includes a high pressure dome type compressor (121), a direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers, wherein a refrigerant based on HFC is used, and a rating torque equivalent friction factor E of the direct drive type electrically driven expansion valve (Z) is set to 0.47 or more and less than 0.94.

A twenty-first refrigerating apparatus of the present invention includes a low pressure dome type compressor (121), a direct drive type electrically driven expansion valve (Z), a heat source side heat exchanger (123) and a heat application side heat exchanger (131) one or both of which, are constituted by a plurality of heat exchangers, wherein a refrigerant based on HFC is used, and a rating torque equivalent friction factor E of the direct drive type electrically driven expansion valve (Z) is set to 0.66 or more and less than 0.99.

A twenty-second refrigerating apparatus of the present invention includes a high pressure dome type compressor (121), a direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers, wherein a refrigerant having a discharge temperature in the same level as that of R22 or higher is used, and a rating torque equivalent friction factor E of the direct drive type electrically driven expansion valve (Z) is set to 0.80 or more and less than 1.20.

A twenty-third refrigerating apparatus of the present invention includes a high pressure dome type compressor (121), a direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers, wherein a refrigerant of R32 alone or a R32 rich mixture comprising an amount of more than 50 wt % of R32 is used, the rating torque equivalent friction factor E of the direct drive type electrically driven expansion valve (Z) is set to 0.94 or more and less than 1.41.

A twenty-fourth refrigerating apparatus of the present invention includes a high pressure dome type compressor (121), the direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers, wherein a R32 rich mixture refrigerant having a discharge temperature of more than about 10° C. higher than that of R22 is used, and a rating torque equivalent friction factor E of the direct drive type electrically driven expansion valve (Z) is set to 0.94 or more and less than 1.41.

A twenty-fifth refrigerating apparatus of the present invention includes a high pressure dome type compressor (121), a direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers, wherein a refrigerant based on HFC is used, and a rating torque equivalent friction factor E of the direct drive type electrically driven expansion valve (Z) is set to 0.94 or more and less than 1.41.

A twenty-sixth refrigerating apparatus of the present invention includes a low pressure dome type compressor (121), a direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers, wherein a refrigerant based on HFC is used, and a rating torque equivalent friction factor E of the direct drive type electrically driven expansion valve (Z) is set to 0.99 or more.

A twenty-seventh refrigerating apparatus of the present invention includes a high pressure dome type compressor (121), a direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers, wherein a refrigerant having a discharge temperature in the same level as that of R22 or higher is used, and a rating torque equivalent friction factor E of the direct drive type electrically driven expansion valve (Z) is set to 1.20 or more.

A twenty-eighth refrigerating apparatus of the present invention includes a high pressure dome type compressor (121), a direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers, wherein a refrigerant of R32 alone or a R32 rich mixture comprising an amount of more than 50 wt % of R32 is used, the rating torque equivalent friction factor E of the direct drive type electrically driven expansion valve (Z) is set to 1.41 or more.

A twenty-ninth refrigerating apparatus of the present invention includes a high pressure dome type compressor (121), the direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers, wherein a R32 rich mixture refrigerant having a discharge temperature of more than about 10° C. higher than that of R22 is used, and a rating torque equivalent friction factor E of the direct drive type electrically driven expansion valve (Z) is set to 1.41 or more.

A thirtieth refrigerating apparatus of the present invention includes a high pressure dome type compressor (121), a direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers, wherein a refrigerant based on HFC is used, and a rating torque equivalent friction factor E of the direct drive type electrically driven expansion valve (Z) is set to 1.41 or more.

A thirty-first refrigerating apparatus of the present invention performs a vapor compression refrigerating cycle, wherein a direct drive type electrically driven expansion valve (Z) is set based on a rating torque equivalent friction factor E.

A thirty-second refrigerating apparatus of the present invention includes a compressor (121), a heat source side heat exchanger (123), a direct drive type electrically driven expansion valve (Z), and a heat application side heat exchanger (131), wherein a rating torque equivalent friction factor E of the direct drive type electrically driven expansion valve (Z) is set to 0.31 or more.

A thirty-third refrigerating apparatus is any one of the first, the second, the sixth, the seventh, the eleventh, the twelfth, the sixteenth, the seventeenth, the twenty-first, the twenty-second, the twenty-sixth, the twenty-seventh, the thirty-first, and the thirty-second refrigerating apparatuses, wherein the refrigerant is R134a.

A thirty-fourth refrigerating apparatus is any one of the first, the second, the sixth, the seventh, the eleventh, the twelfth, the sixteenth, the seventeenth, the twenty-first, the twenty-second, the twenty-sixth, the twenty-seventh, the thirty-first, and the thirty-second refrigerating apparatuses, wherein the refrigerant is R407C.

A thirty-fifth refrigerating apparatus is any one of the first, the second, the sixth, the seventh, the eleventh, the twelfth, the sixteenth, the seventeenth, the twenty-first, the twenty-second, the twenty-sixth, the twenty-seventh, the thirty-first, and the thirty-second refrigerating apparatuses, wherein the refrigerant is R410A.

A thirty-sixth refrigerating apparatus is any one of the first, the second, the sixth, the seventh, the eleventh, the twelfth, the sixteenth, the seventeenth, the twenty-first, the twenty-second, the twenty-sixth, the twenty-seventh, the thirty-first, and the thirty-second refrigerating apparatuses, wherein the refrigerant is R404A or R507A.

A thirty seventh refrigerating apparatus is any one of the fourth, the ninth, the fourteenth, the nineteenth, the twenty-fourth, the twenty-ninth, the thirty-first, and the thirty-second refrigerating apparatuses, wherein the refrigerant is any one of R32/125 (R32 is at least 70%), R32/134a (R32 is at least 50%), R32/propane (R32 is at least 80%), R32/butane (R32 is at least 80%), and R32/isobutane (R32 is at least 80%).

A thirty-eighth refrigerating apparatus is any one of the eleventh to the thirty-second refrigerating apparatuses, and utilizes an existing pipe.

A thirty-ninth refrigerating apparatus is any one of the first to the thirty-second refrigerating apparatuses, and includes a refrigerating machine oil based on polyvinyl ether.

A fortieth refrigerating apparatus is any one of the first to the thirty-second refrigerating apparatuses, and includes a refrigerating machine oil based on polyol ester.

A forty-first refrigerating apparatus is any one of the first the thirty-second refrigerating apparatuses, and includes a refrigerating machine oil based on carbonic acid ester.

A forty-second refrigerating apparatus is any one of the first the thirty-second refrigerating apparatuses, and includes a refrigerating machine oil based on alkylbenzene.

A forty-third refrigerating apparatus is any one of the first the thirty-second refrigerating apparatuses, and includes a refrigerating machine oil based on mineral oil.

A forty-fourth refrigerating apparatus is any one of the first the thirty-second refrigerating apparatuses, and includes a refrigerating machine oil based on polyvinyl ether, polyol ester or carbonic acid ester and mixed with alkylbenzene or mineral oil.

A forty-fifth refrigerating apparatus is any one of the thirty ninth to the forty-fourth refrigerating apparatuses, wherein an extreme-pressure additive concentration in the refrigerating machine oil is 0.3 or more and 1% by weight or less (refrigerating machine oil weight ratio).

A forty-sixth refrigerating apparatus is any one of the first to the thirty-second refrigerating apparatuses, wherein the compressor (121) is a swing type compressor.

A forty-seventh refrigerating apparatus is any one of the first to the thirty-second refrigerating apparatuses, wherein the direct drive type electrically driven expansion valve (Z) includes a valve body (1) including a needle (2), an insert hole (16) of the needle (2), and a refrigerant passage (9) that positioned on one end of the insert hole (16) and whose passage area is adjusted by the needle (2), a case (3) that is attached to the valve body (1) so that the other side of the insert hole (16) is enclosed in an internal space (30), and includes at least a part of electrically driven means (X) for driving the needle (2) in the internal space (30), and flow-rate lowering means (P) for lowering a flow rate of a refrigerant flowing from the refrigerant passage (9) to the internal space (30) through an insert gap (17) formed between the insert hole (16) and the needle (2).

A forty-eighth refrigerating apparatus is any one of the first to the thirty-second refrigerating apparatuses, wherein the direct drive type electrically driven expansion valve (Z) includes a valve body (1) including a needle (2), an insert hole (16) of the needle (2), and a refrigerant passage (9) that positioned on one end of the insert hole (16) and whose passage area is adjusted by the needle (2), a case (3) that is attached to the valve body (1) so that the other side of the insert hole (16) is enclosed in an internal space (30), and includes at least a part of electrically driven means (X) for driving the needle (2) in the internal space (30), the electrically driven means (X) having a thread portion that is threaded outside the insert hole (16) and extends in a shaft direction of the insert hole (16), a thread gap (23) in communication with the insert hole (16) on the other side of the insert hole (16), and flow-rate lowering means (Q) for lowering a flow rate of a refrigerant flowing from the refrigerant passage (9) to the thread gap (23) through the insert hole (16).

A forty-ninth refrigerating apparatus is any one of the first to the thirty-second refrigerating apparatuses, wherein the direct drive type electrically driven expansion valve (Z) includes a valve body (1) including a needle (2), an insert hole (16) of the needle (2), and a refrigerant passage (9) that positioned on one end of the insert hole (16) and whose passage area is adjusted by the needle (2), a case (3) that is attached to the valve body (1) so that the other side of the insert hole (16) is enclosed in an internal space (30), and includes at least a part of electrically driven means (X) for driving the needle (2) in the internal space (30), an outer circumferential gap (21) formed between an outer circumferential surface of the electrically driven means (X) and an inner circumferential surface of the case (3), and flow-rate lowering means (R) for lowering a flow rate of a refrigerant flowing between a first space (31) positioned on one side of the electrically driven means (X) in the inner space (30) and a second space (32) positioned on the other side thereof through the outer circumferential gap (21).

A fiftieth refrigerating apparatus is any one of the first to the thirty-second refrigerating apparatuses, wherein a mixed refrigerant of R32 alone or R32 rich mixture comprising an amount of more than 50 wt % of R32 is used, and a permanent magnet (4) of a driving motor (X) of the direct drive type electrically driven expansion valve (Z) is a ferrite magnet A fifty-first refrigerating apparatus is any one of the first to the thirty-second refrigerating apparatuses, wherein a permanent magnet (4) of a driving motor (X) of the direct drive type electrically driven expansion valve (Z) is a rare earth magnet.

A fifty-second refrigerating apparatus is any one of the first to the thirty-second refrigerating apparatuses, wherein a permanent magnet (4) of a driving motor (X) of the direct drive type electrically driven expansion valve (Z) is a rare earth magnet having a demagnetization temperature of 130° C. or more.

A fifty-third refrigerating apparatus is any one of the first to the thirty-second refrigerating apparatuses, wherein a mixed refrigerant of R32 alone or R32 rich mixture comprising an amount of more than 50 wt % of R32 is used, and a permanent magnet (4) of a driving motor (X) of the direct drive type electrically driven expansion valve (Z) is a rare earth magnet having a demagnetization temperature of 130° C. or more.

A fifty-fourth refrigerating apparatus is any one of the first to the thirty-second refrigerating apparatuses, wherein a permanent magnet (4) of a driving motor (X) of the direct drive type electrically driven expansion valve (Z) is formed of an anisotropic magnetic material.

A fifty-fifth refrigerating apparatus is any one of the first to the thirty-second refrigerating apparatuses, wherein a thread surface of the direct drive type electrically driven expansion valve (Z) is coated with a fluorine resin.

A fifty-sixth refrigerating apparatus is any one of the first to the thirty-second refrigerating apparatuses, wherein a solid lubricant is applied onto a thread surface of the direct drive type electrically driven expansion valve (Z).

A fifty-seventh refrigerating apparatus is any one of the first to the thirty-second refrigerating apparatuses, and includes a refrigerant circuit (110) including two direct drive type electrically driven expansion valves (Z) arranged in series.

A fifty eighth refrigerating apparatus is any one of the first to the thirty-second refrigerating apparatuses, and includes a refrigerant circuit (110) including one direct drive type electrically driven expansion valve (Z).

A fifty-ninth refrigerating apparatus of the present invention includes a low pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant based on hydrocarbon is used, and a rating torque equivalent friction factor E of the direct drive type electrically driven expansion valve (Z) is set to 0.31 or more and less than 0.62.

A sixtieth refrigerating apparatus of the present invention includes a high pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant based on hydrocarbon is used, and a rating torque equivalent friction factor E of the direct drive type electrically driven expansion valve (Z) is set to 0.34 or more and less than 0.68.

A sixty-first refrigerating apparatus of the present invention includes a low pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant based on hydrocarbon is used, and a rating torque equivalent friction factor E of the direct drive type electrically driven expansion valve (Z) is set to 0.62 or more and less than 0.93.

A sixty-second refrigerating apparatus of the present invention includes a high pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant based on hydrocarbon is used, and a rating torque equivalent friction factor E of the direct drive type electrically driven expansion valve (Z) is set to 0.68 or more and less than 1.02.

A sixty-third refrigerating apparatus of the present invention includes a low pressure dome type compressor (121), a direct drive type electrically driven expansion valve (Z), a heat source side heat exchanger (123) and a heat application side heat exchanger (131), the heat source side heat exchanger (131) and the heat application side heat exchanger (131) corresponding to each other one-to-one, wherein a refrigerant based on hydrocarbon is used, and a rating torque equivalent friction factor E of the direct drive type electrically driven expansion valve (Z) is set to 0.93 or more.

A sixty-fourth refrigerating apparatus of the present invention includes a high pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant based on hydrocarbon is used, and a rating torque equivalent friction factor E of the direct drive type electrically driven expansion valve (Z) is set to 1.02 or more.

A sixty-fifth refrigerating apparatus of the present invention includes a low pressure dome type compressor (121), a direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers, wherein a refrigerant based on hydrocarbon is used, and a rating torque equivalent friction factor E of the direct drive type electrically driven expansion valve (Z) is set to 0.33 or more and less than 0.66.

A sixty-sixth refrigerating apparatus of the present invention includes a high pressure dome type compressor (121), a direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers, wherein a refrigerant based on hydrocarbon is used, and a rating torque equivalent friction factor E of the direct drive type electrically driven expansion valve (Z) is set to 0.40 or more and less than 0.80.

A sixty-seventh refrigerating apparatus of the present invention includes a low pressure dome type compressor (121), a direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers, wherein a refrigerant based on hydrocarbon is used, and a rating torque equivalent friction factor E of the direct drive type electrically driven expansion valve (Z) is set to 0.66 or more and less than 0.99.

A sixty-eighth refrigerating apparatus of the present invention includes a high pressure dome type compressor (121), a direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers, wherein a refrigerant based on hydrocarbon is used, and a rating torque equivalent friction factor E of the direct drive type electrically driven expansion valve (Z) is set to 0.80 or more and less than 1.20.

A sixty-ninth refrigerating apparatus of the present invention includes a low pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant based on hydrocarbon is used, and a rating torque equivalent friction factor E of the direct drive type electrically driven expansion valve (Z) is set to 0.99 or more.

A seventieth refrigerating apparatus of the present invention includes a high pressure dome type compressor (121), a direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers, wherein a refrigerant based on hydrocarbon is used, and a rating torque equivalent friction factor E of the direct drive type electrically driven expansion valve (Z) is set to 1.20 or more.

A seventy-first refrigerating apparatus of the present invention is any one of the fifty-ninth to the seventieth refrigerating apparatuses, and utilizes an existing pipe.

A seventy-second refrigerating apparatus of the present invention is any one of the fifty-ninth to the seventieth refrigerating apparatuses, and includes a refrigerating machine oil based on alkylbenzene.

A seventy-third refrigerating apparatus of the present invention is any one of the fifty-ninth to the seventieth refrigerating apparatuses, and includes a refrigerating machine oil based on mineral oil.

A seventy-fourth refrigerating apparatus of the present invention is the seventy-second or the seventy-third refrigerating apparatus, wherein an extreme-pressure additive concentration in the refrigerating machine oil is 0.3 or more and 1% by weight or less (refrigerating machine oil weight ratio).

A seventy-fifth refrigerating apparatus of the present invention is any one of the fifty-ninth to the seventieth refrigerating apparatuses, wherein the compressor (121) is a swing type compressor.

A seventy-sixth refrigerating apparatus of the present invention is any one of the fifty-ninth to the seventieth refrigerating apparatuses, wherein the direct drive type electrically driven expansion valve (Z) includes a valve body (1) including a needle (2), an insert hole (16) of the needle (2), and a refrigerant passage (9) that positioned on one end of the insert hole (16) and whose passage area is adjusted by the needle (2), a case (3) that is attached to the valve body (1) so that the other side of the insert hole (16) is enclosed in an internal space (30), and includes at least a part of electrically driven means (X) for driving the needle (2) in the internal space (30), and flow-rate lowering means (P) for lowering a flow rate of a refrigerant flowing from the refrigerant passage (9) to the internal space (30) through an insert gap (17) formed between the insert hole (16) and the needle (2).

A seventy-seventh refrigerating apparatus of the present invention is any one of the fifty-ninth to the seventieth refrigerating apparatuses, wherein the direct drive type electrically driven expansion valve (Z) includes a valve body (1) including a needle (2), an insert hole (16) of the needle (2), and a refrigerant passage (9) that positioned on one end of the insert hole (16) and whose passage area is adjusted by the needle (2), a case (3) that is attached to the valve body (1) so that the other side of the insert hole (16) is enclosed in an internal space (30), and includes at least a part of electrically driven means (X) for driving the needle (2) in the internal space (30), the electrically driven means (X) having a thread portion that is threaded outside the insert hole (16) and extends in a shaft direction of the insert hole (16), a thread gap (23) in communication with the insert hole (16) on the other side of the insert hole (16), and flow-rate lowering means (Q) for lowering a flow rate of a refrigerant flowing from the refrigerant passage (9) to the thread gap (23) through the insert hole (16).

A seventy-eighth refrigerating apparatus of the present invention is any one of the fifty-ninth to the seventieth refrigerating apparatuses, wherein the direct drive type electrically driven expansion valve (Z) includes a valve body (1) including a needle (2), an insert hole (16) of the needle (2), and a refrigerant passage (9) that positioned on one end of the insert hole (16) and whose passage area is adjusted by the needle (2), a case (3) that is attached to the valve body (1) so that the other side of the insert hole (16) is enclosed in an internal space (30), and includes at least a part of electrically driven means (X) for driving the needle (2) in the internal space (30), an outer circumferential gap (21) formed between an outer circumferential surface of the electrically driven means (X) and an inner circumferential surface of the case (3), and flow-rate lowering means (R) for lowering a flow rate of a refrigerant flowing between a first space (31) positioned on one side of the electrically driven means (X) in the inner space (30) and a second space (32) positioned on the other side thereof through an outer circumferential gap (21).

A seventy-ninth refrigerating apparatus of the present invention is any one of the fifty-ninth to the seventieth refrigerating apparatuses, wherein a permanent magnet (4) of a driving motor (X) of the direct drive type electrically driven expansion valve (Z) is a ferrite magnet An eightieth refrigerating apparatus of the present invention is any one of the fifty-ninth to the seventieth refrigerating apparatuses, wherein a permanent magnet (4) of a driving motor (X) of the direct drive type electrically driven expansion valve (Z) is a rare earth magnet.

An eighty-first refrigerating apparatus of the present invention is any one of the fifty-ninth to the seventieth refrigerating apparatuses, wherein a permanent magnet (4) of a driving motor (X) of the direct drive type electrically driven expansion valve (Z) is formed of an anisotropic magnetic material.

An eighty-second refrigerating apparatus of the present invention is any one of the fifty-ninth to the seventieth refrigerating apparatuses, wherein a thread surface of the direct drive type electrically driven expansion valve (Z) is coated with a fluorine resin.

An eighty-third refrigerating apparatus of the present invention is any one of the fifty-ninth to the seventieth refrigerating apparatuses, wherein a solid lubricant is applied onto a thread surface of the direct drive type electrically driven expansion valve (Z).

An eighty-fourth refrigerating apparatus of the present invention is any one of the fifty-ninth to the seventieth refrigerating apparatuses, and includes a refrigerant circuit (110) including two direct drive type electrically driven expansion valves (Z) arranged in series.

An eighty-fifth refrigerating apparatus of the present invention is any one of the fifty-ninth to the seventieth refrigerating apparatuses, and includes a refrigerant circuit (110) including one direct drive type electrically driven expansion valve (Z).

Therefore, the present invention easily can solve the clogging of the direct drive type electrically driven expansion valve (Z), regardless of, for example, the type of refrigerants.

In other words, the present invention provides a totally novel design approach for a driving motor (X) and a thread portion of a direct drive type electrically driven expansion valve (Z), so that the direct drive type electrically driven expansion valve (Z) that can realize reliable driving without wastefulness can be provided.

In particular, in the case where a HFC refrigerant is used, the clogging of the direct drive type electrically driven expansion valve (Z) can be prevented in each embodiment of the refrigerant type, the use temperature, the air conditioner capacity and the pair or the multi type.

In the case where a currently used refrigerant such as R407C, R410A and R134a is used, the direct drive type electrically driven expansion valve (Z) can be designed very easily. In particular, when other refrigerants such as R32 are used, the direct drive type electrically driven expansion valve (Z) also can be designed very easily.

Furthermore, it is quantitatively grasped that as the temperature of the refrigerating machine oil is higher, the clogging substance is generated in a larger amount, and the degree of clogging becomes larger. As a result, the direct drive type electrically driven expansion valve (Z) can be designed in the accordance with the temperature. Therefore, the present invention never fail to solve the problem of clogging of the expansion valve caused by using a single refrigerant of R32 alone or a mixed refrigerant containing a large amount of R32 that increases the discharge temperature and the temperature of the refrigerating machine oil. Furthermore, in a refrigerating apparatus for low temperature in which the discharge temperature is high, the direct drive type electrically driven expansion valve (Z) can be designed very easily.

In a mixed refrigerant containing a large amount of R32, when R32 exceeds 50 wt %, the discharge temperature becomes high. For example, for R32/125 (R32 is at least 70%), R32/134a (R32 is at least 50%), R32/propane (R32 is at least 80%), R32/butane (R32 is at least 80%), and R32/isobutane (R32 is at least 80%), the discharge is at least 10° C. higher than that of R22. For such refrigerants, optimum design for the direct drive type electrically driven expansion valve (Z) can be achieved very easily.

Furthermore, in the case where a refrigerant with a low temperature is used, on the other hand, it is possible to design a proper direct drive type electrically driven expansion valve (Z), so that excess design that might occur because of the emphasis on reliability of the direct drive type electrically driven expansion valve (Z) can be prevented.

Furthermore, when an existing pipe is used, it is conventionally necessary to clean the pipe in order to remove mineral oil or impurities remaining in the pipe. However, since the present invention allows proper design of the direct drive type electrically driven expansion valve (Z), so that the existing pipe can be utilized without pipe cleaning. As a result, the cost for installation work can be reduced and the term for the work can be shortened.

BEST MODE FOR CARRYING OUT THE INVENTION

Hereinafter, the present invention will be described with reference to the accompanying drawings in detail.

Figure 1:
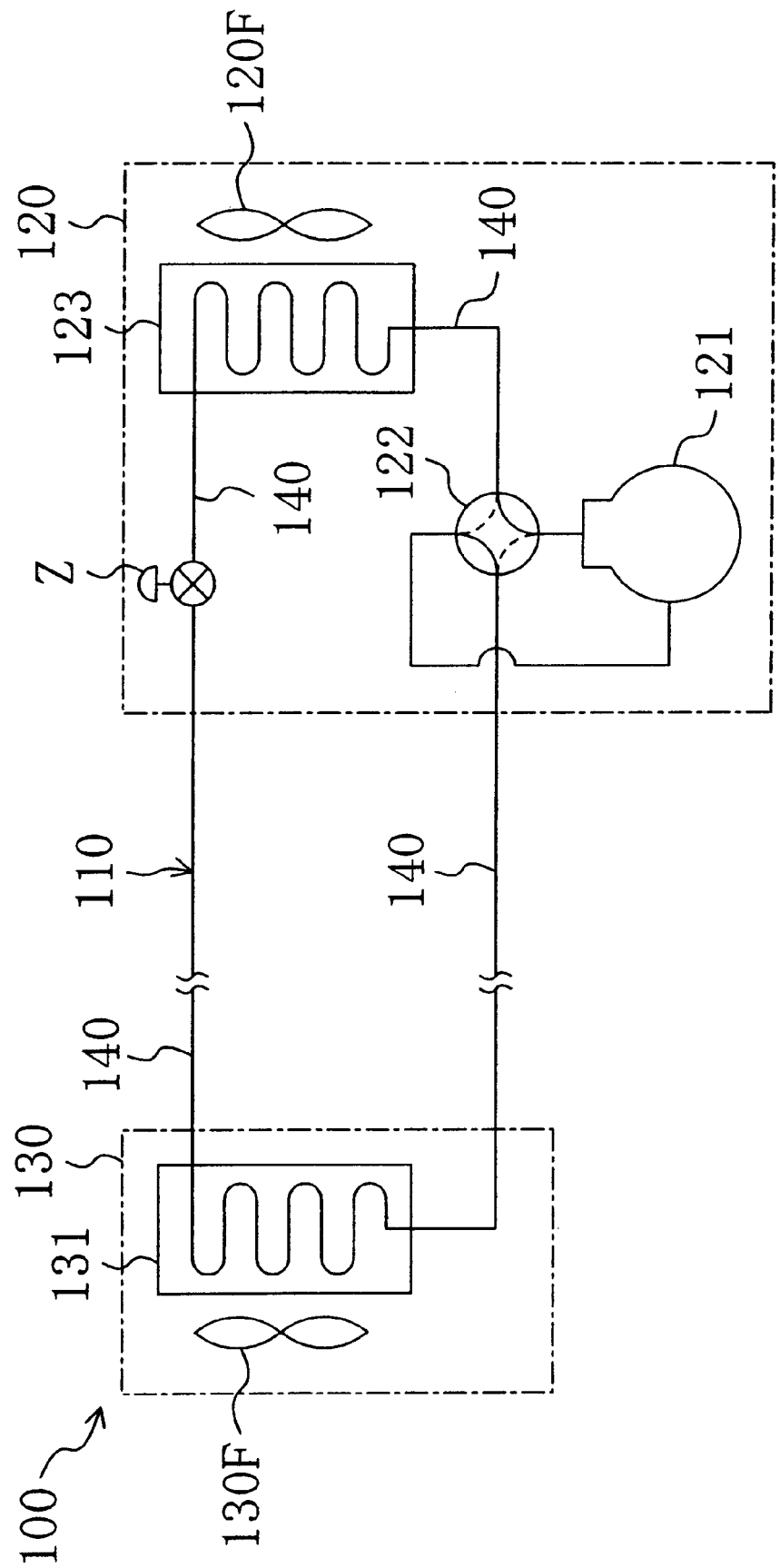
FIG. 1 is a diagram of a refrigerant circuit of an embodiment of the present invention.

As shown in FIG. 1, a refrigerating apparatus (100) of this embodiment has a configuration of a so-called separate type. The refrigerating apparatus (100) includes a refrigerant circuit (110) connecting one external unit (120) that is a unit on the heat source side to one internal unit (130) that is a unit on the heat application side.

The external unit (120) includes a swing type compressor (121) whose operation frequency is regulated by an inverter, a four path switching valve (122) that switches as shown by the solid line in FIG. 1 in cooling operation cycles and switches as shown by the broken line in FIG. 1 in warming operation cycles, an external heat exchanger (123) as a heat exchanger on the heat source side, that functions as a condenser in cooling operation and as an evaporator in warming operation, a direct drive type electrically driven expansion valve (Z) that constitutes an expansion mechanism to reduce the pressure of a refrigerant.

On the other hand, the internal unit (130) includes an internal heat exchanger (131) as a heat exchanger on the heat application side that functions as an evaporator at the cooling operation and as a condenser in warming operation.

In other words, the external heat exchanger (123) and the internal heat exchanger (131) are configured to correspond to each other at one-to-one.

The external heat exchanger (123) is provided with an external fan (120F), and the internal heat exchanger (131) is provided with an internal fan (130F).

The compressor (121), the four path switching valve (122), the external heat exchanger (123), the direct drive type electrically driven expansion valve (Z), the internal heat exchanger (131) are connected in this order via a refrigerant pipe (140), and the refrigerant circulation circuit (111) is configured as a closed circuit that can operate reversibly by switching the four path switching valve (122) in cooling operation cycles and warming operation cycles to generate heat transfer by the circulation of the refrigerant.

Next, the direct drive type electrically driven expansion valve (Z) will be described.

Figure 2:
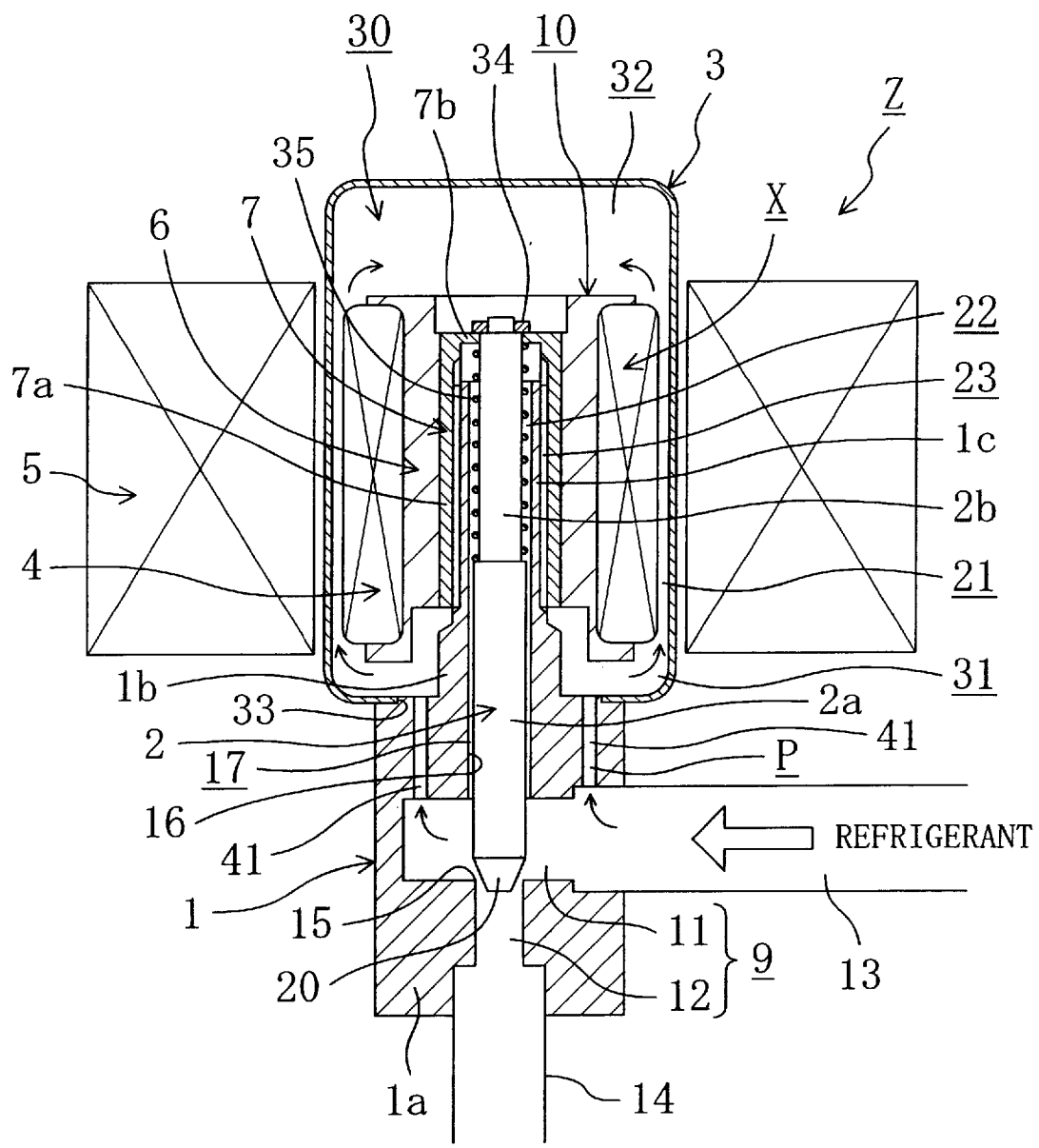
FIG. 2 is a cross-sectional view showing the main portion of an electrically driven expansion valve of the present invention.

As shown in FIG. 2, the direct drive type electrically driven expansion valve (Z) is provided with a valve body (1), a needle (2) and a case (3). The valve body (1) is configured as a different diameter member including a passage forming portion (la) having a large diameter positioned on one side in its shaft direction, a thread forming portion (1c) having a small diameter positioned on the other side, and a shoulder portion (1b) position therebetween. The shoulder portion (1b) and the thread forming portion (1c) are inserted in an inner space (30) of the case (3) through an opening (33) formed on one end face of the case (3). In this state, the valve body (1) is integrated with the case (3).

The passage forming portion (1a) of the valve body (1) is provided with a refrigerant passage (9). The refrigerant passage (9) includes a refrigerant inlet portion (11) and a refrigerant outlet portion (12) that are substantially orthogonal, and a valve seat portion (15) is formed on the hem of the refrigerant inlet portion (11). A refrigerant inlet pipe (13) is connected to the refrigerant inlet portion (11), and a refrigerant outlet pipe (14) is connected to the refrigerant outlet portion (12).

Furthermore, a needle insert hole (16) having a predetermined diameter is formed in a portion from the refrigerant passage (9) of the passage forming portion (1a) of the valve body (1) to the end of the thread forming portion (1c). One end of the needle insert hole (16) is opened to the refrigerant passage (9), and the other end is opened to the end face of the thread forming portion (1c).

The needle (2) having a valve head portion (20) at one end is inserted slidably into the needle insert hole (16). The needle (2) moves in the shaft direction to increase and decrease the passage area between the valve head portion (20) and the valve seat portion (15). This increase and decrease controls the flow rate of the refrigerant flowing from the refrigerant inlet pipe (13) to the refrigerant outlet pipe (14). Furthermore, the valve head portion (20) is seated on the valve seat portion (15) to be closed completely, so that the refrigerant is prevented from flowing.

The needle (2) is configured as a shaft member with a step including a sliding shaft portion (2a) having a large diameter positioned on the valve head portion (20) side and a supporting shaft portion (2b) having a small diameter. The sliding shaft portion (2a) is slidably supported by the needle insert hole (16) so that the position of the shaft center of the sliding shaft portion (2a) is maintained. In this case, a small needle insert gap (17) is formed between the inner circumferential surface of the needle insert hole (16) and the sliding shaft portion (2a). An inner circumferential gap (22) having a larger gap size than the needle insert gap (17) is formed between the inner circumferential surface of the needle hole (16) and the supporting shaft portion (2b).

A male thread is formed on the outer circumferential surface of the thread forming portion (1c) of the valve body (1). A rotor portion (10) constituting a part of a driving motor (X) for driving the needle (2) in the shaft direction is provided in the diameter direction of the thread forming portion (1c). The driving motor (X) is configured as a so-called "stepping motor", and is provided with the rotor portion (10) and an electromagnet (5) disposed on the outer circumference side of the case (3).

The rotor portion (10) is provided with a thread forming member (7) and a spacer (6). The thread forming member (7) is formed as a cylinder having a bottom. A female thread engaged in the male thread formed on the thread forming portion (1c) of the valve body (1) is formed on the inner circumferential surface (7a) of the thread forming member (7). The spacer (6) is formed as a cylinder having a brim. A permanent magnet (4) is held on the outer circumference side of the space (6), and a circumferential wall portion (7a) of the thread forming portion (7) is forcibly engaged and attached on the inner circumference side of the spacer (6).

The rotor (10) is attached to the valve body (1) by threading the thread forming member (7) to the thread forming portion (1c) of the valve body (1) from the upper side (end portion side). Thus, the rotor portion (10) is rotated integrally corresponding to the conducting electricity amount (pulse value) of the electromagnetic (5), and moves relatively to the thread forming portion (1c) of the valve body (1) in the shaft direction.

The rotor portion (10) is coupled to the needle (2) so that the needle (2) moves in the opening and closing direction (i.e., in the shaft direction) by utilizing the movement of the rotor portion (10) in the shaft direction. More specifically, the upper end side of the needle (2) penetrates an end face portion (7b) of the thread forming member (7) and protrudes upward, and a stopping member (34) is provided on the edge of the protrusion so that the needle (2) is prevented from dropping downward. Furthermore, a spring (35) is provided between the lower surface of the end face portion (7b) of the thread forming member (7) and the step portion formed by the sliding shaft portion (2a) and the supporting shaft portion (2b) of the needle (2). The rotor (10) is energized by the spring (35) constantly in the direction in which the stopping member (34) is contacted with the end face portion (7b) of the thread forming member (7).

Therefore, the needle (2) increases and decreases the passage area by moving integrally with the rotor portion (10) that moves in the shaft direction in the range up to the seating of the valve head portion (20) onto the valve seat portion (15). However, after the valve head portion (20) is seated on the valve seat portion (15), that is, in the state where the needle (2) is prevented from moving downward further, the rotor (10) moves downward by a predetermined side while shrinking the spring (35), and the force of the spring (35) maintains the valve closing state of the needle (2). In this case, a predetermined gap is generated between the stopping member (34) and the end face portion (7b) of the thread forming member (7).

Furthermore, in the rotor portion (10), the gap between the permanent magnet (4) and the inner circumferential surface of the case (3) positioned on the outside of the permanent magnet (4) is set to be small (e.g., about 0.2 mm) to hold a proper magnetism effect between the permanent magnet (4) and the electromagnet (5). Thus, the inner space (30) of the case (3) is segmented into a first space (31) positioned on the lower side and a second space (32) positioned on the upper side by the rotor (10). The spaces (31, 32) are in communication with each other via an outer circumferential gap (21) formed between the outer circumferential surface of the permanent magnetic (4) and the inner circumferential surface of the case (3).

In the direct drive type electrically driven expansion valve (Z), when the refrigerant pressure on the upstream side of the direct drive type electrically driven expansion valve (Z) is increased by the driving of the compressor (121), a differential pressure is generated in the inner portion of the direct drive type electrically driven expansion valve (Z) in response to the increase of the refrigerant pressure. As a result, a part of the refrigerant flows from the refrigerant passage (9) to the inner space (30) side of the case (3) through the needle insert gap (17). More specifically, the refrigerant that flows into the needle insert gap (17) goes up through the needle insert gap (17) and further goes up from the needle insert gap (17) through the inner circumferential gap (22) formed between the portion on the other side of the needle (2) and the needle insert hole (16) of the valve body (1). Thereafter, the refrigerant changes its direction and flows down through a thread gap (23) between the thread forming portion (1c) of the valve body (1) and the thread forming member (7) threaded thereto, and reaches the first space (31). The refrigerant that flows into the first space (31) goes up through the circumferential gap (21) and flows into the second space (32).

Thus, the flow rate of the refrigerant to the first space (31) and the second space (32) cancels the differential state in both sides of the shaft direction of the rotor portion (10), so that smooth movement of the rotor portion (10) is ensured. In this stage, the needle (2) moves integrally and in cooperation with the movement of the rotor portion (10), so that the refrigerant flow rate is controlled.

On the other hand, when the compressor (121) stops and the refrigerant pressure on the upstream of the direct drive type electrically driven expansion valve (Z) is reduced, the refrigerant having a reduced pressure on the case (3) side is circulated back to the refrigerant passage (9) side through the path on the other way around from the above-described case.

However, in the sliding portion of the compressor (121), sludge having a high viscosity is generated, for example, from a refrigerating machine oil because of high temperatures due to metallic contact. This sludge is circulated in the refrigerant circuit (110) so that the sludge is attached to the needle insert gap (17).

In the direct drive type electrically driven expansion valve (Z) of this embodiment, the attachment of the sludge onto the wall surface of the narrow needle insert gap (17) formed between the needle insert hole (16) provided in the valve body (1) and the needle (2) is prevented as much as possible. In other words, the refrigerant flows between the refrigerant passage (9) and the inner space (30) on the case (3) side, corresponding to the increase and the decrease of the refrigerant pressure on the refrigerant passage (9) side in response to the operation and the stop of the operation of the compressor (121). In this case, the attachment of the sludge onto the wall surface of the needle insert gap (17) is suppressed as much as possible by reducing the amount of the refrigerant flowing through the needle insert gap (17).

More specifically, a suitable number of refrigerant passages (41) that are means (P) for lowering the flow rate of the refrigerant directly communicating between the refrigerant passage (9) and the first space (31) of the case (3) side without via the needle insert gap (17) are formed in the passage forming portion (1a) of the valve body (1).

According to this embodiment, in the case where the refrigerant flows between the refrigerant passage (9) side and the inner space (30) side by the differential pressure, that is, in the case where the refrigerant flows from the refrigerant passage (9) side to the inner space (30) side at the start of the operation of the compressor (121) and the refrigerant flows from the inner space (30) side to the refrigerant passage (9) side at the stop of the operation of the compressor (121), the passage resistance in the refrigerant passage (41) is significantly smaller than that in the needle insert gap (17). Therefore, most of the refrigerant flows through the refrigerant passage (41), and thus the amount of the refrigerant that flows through the needle insert gap (17) is relatively reduced.

As a result, even if the refrigerant or a refrigerating machine oil that generates a large amount of sludge is used, the decrease of the amount of the refrigerant that flows through the needle insert gap (17) reduces the amount of the sludge attached to the wall surface of the needle insert gap (17) by a reduced amount of the refrigerant flowing the needle engage tap (17).

Therefore, the interference with the operation of the needle (2) due to the attachment of the sludge having a high viscosity onto the wall surface of the needle insert gap (17) can be prevented as much as possible. As a result, since a proper operation of the needle (2) is ensured, for example, abnormal liquid compression or superheat of the compressor (121) can be prevented, and the reliability of the refrigerating apparatus (100) in terms of its operation can be enhanced.

Since the refrigerant passage (41) has a large passage area, attachment of sludge hardly occurs in the refrigerant passage (41). In this embodiment, the refrigerant passage (41) functions as an equalizing hole as well, so that no equalizing hole is not provided.

Setting of the Direct Drive Type Electrically Driven Expansion Valve (Z)

The direct drive type electrically driven expansion valve (Z) is set based on the rating torque equivalent friction factor E, which is a feature of the present invention. More specifically, the rating torque equivalent friction factor E of the direct drive type electrically driven expansion valve (Z) is set to 0.31 or more.

The principal basic reasons why the direct drive type electrically driven expansion valve (Z) is selected based on the rating torque equivalent friction factor E will be described in detail.

First, in the sliding portion of the compressor (121), metallic contact occurs under severe conditions. In this case, HFC refrigerants contain no chlorine, so that the refrigerants do not have self-lubricating properties. In the case of HCFC refrigerants or CFC refrigerants, even when metallic contact occurs, the temperature is not significantly increased because of their self-lubricant properties. In the case of the HFC refrigerants containing no chlorine, the temperature of the metallic contact portion is as high as more than 200° C., so that the refrigerating machine oil or the processed oil left in the inside of the refrigerant circuit (110) is deteriorated, and sludge having a high viscosity is generated. Furthermore, the HFC refrigerants are not dissolved with the thus generated sludge. The sludge separated from the HFC liquid refrigerant is attached, for example, to the inside of the direct drive type electrically driven expansion valve (Z).

As described above, the direct drive type electrically driven expansion valve (Z) includes the driving motor (X) and the thread portion, in addition to the needle (2). When the sludge having a high viscosity is attached to the needle (2) or the thread portion, the needle (2) is prevented from being driven, so that the refrigerant flow rate cannot be controlled by the direct drive type electrically driven expansion valve (Z). Thus, malfunctions such as burning due to an increase in the temperature of the compressor (121) and burning of bearings due to reversed liquid occur. Therefore, in this embodiment, the means (P) for lowering the flow rate of the refrigerant is provided in the needle (2).

Figure 3:
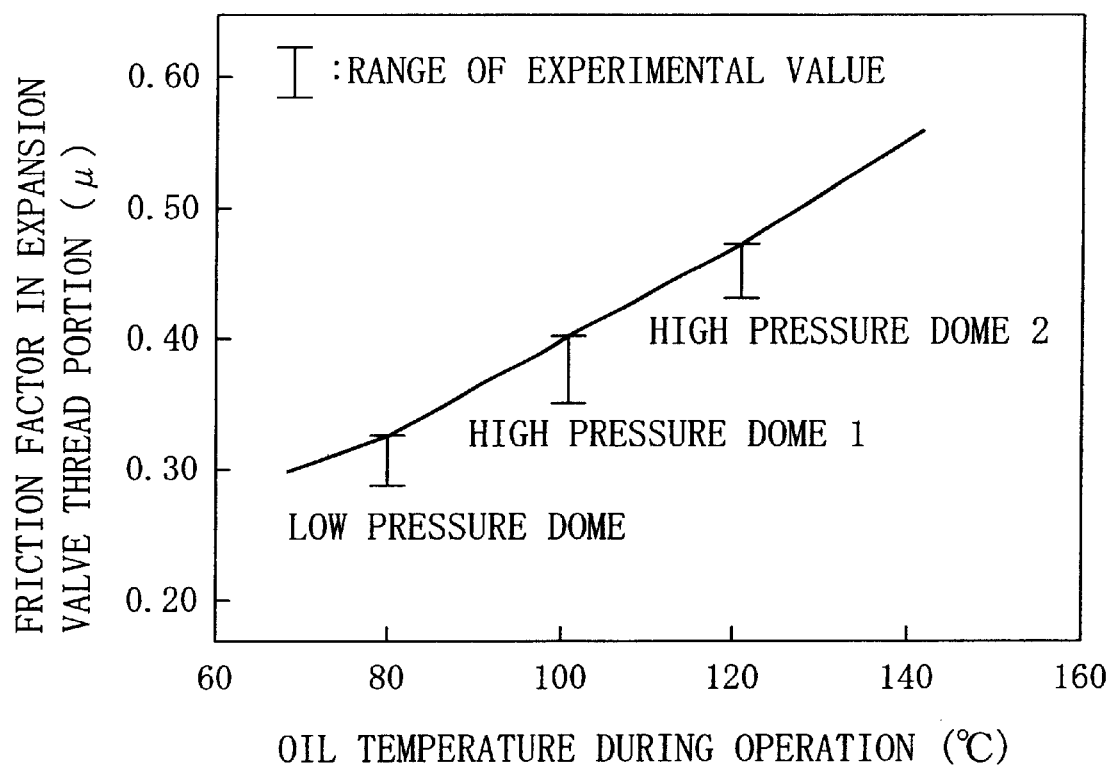
FIG. 3 is a characteristic graph of the friction factor with respect to the oil temperature.
Figure 4:
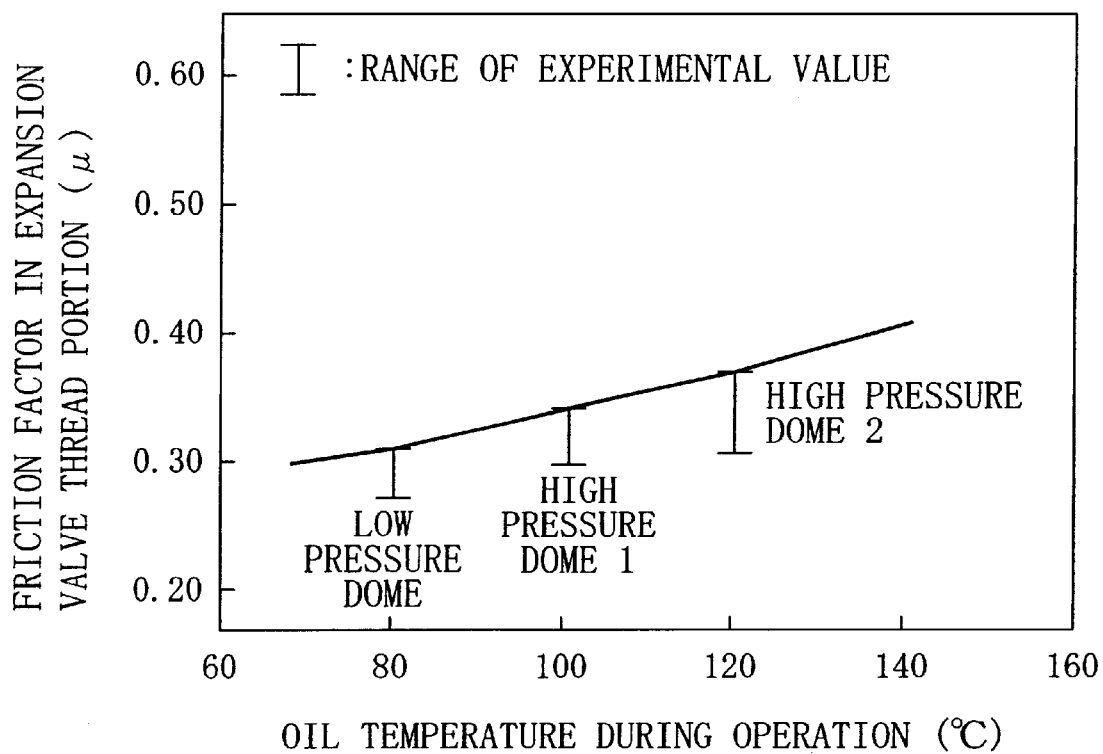
FIG. 4 is another characteristics graph of the friction factor with respect to the oil temperature.

The inventors of the present invention conducted a long term durability test of the direct drive type electrically driven expansion valve (Z). FIGS. 3 and 4 show the results. In the FIGS. 3 and 4, the refrigerant used for the test was R407C.

FIG. 3 shows the results in the case where a multi air conditioner provided with a plurality of internal units (130), which is not one shown in FIG. 1, is used, and the refrigerant previously contains impurities such as processed oil or water and air.

FIG. 2 shows the results in the case where a so-called pair air conditioner provided with one external unit (120) and one internal unit (130) is used.

In the case of the multi-air conditioners, a pipe on the site is long, and the amount of the mixed impurities, water and air in the pipe is larger than in the case of the pair air conditioners. In each case, the amount of the impurities, etc., mixed in the production process or at the time of the installation on the site was measured experimentally. Based on these results, the maximum amount of the impurities or the like when a multi-air conditioner or a pair air conditioner was installed was predicted, and the corresponding amount was mixed in the refrigerating cycle of the refrigerant circuit (110) prior to the test start.

The operation period is predetermined to correspond to a use term of about 13 years. Since the sludge generation in the inside of the compressor (121) is due to a chemical change, when the temperature of the refrigerating machine oil is high, the generation rate is high. The temperature of the refrigerating machine oil is higher when the compressor (121) is of a high pressure dome type than in the case of a low pressure dome type. This case is shown by high pressure dome 1 in FIGS. 3 and 4.

In the case where the refrigerant is R407 and R410A, the oil temperature is about the same level as that of R22. Compared with those cases, in the case of R32 refrigerants, the discharge temperature of the compressor (121) is about 20° C. higher. In the case of R32 refrigerants and high pressure dome compressor (121), the oil temperature is about 20° C. higher. This case is shown by high pressure dome 1 in FIGS. 3 and 4.

Therefore, the oil temperature during operation is kept constant so as to evaluate the effect of the oil temperature on the sludge generation.

Furthermore, the magnitude of the differential pressure that affects the inlet and the output of the direct drive type electrically driven expansion valve (Z) during operation is varied with the refrigerants. The differential pressure is varied with the use of the refrigerating apparatus (100) such as one for air conditioning or for low temperature. Table 1 shows the differential pressures for each refrigerant and each use of the refrigerating apparatus (100).

TABLE 1

|  | For air conditioning air cooling | For air conditioning water cooling | For low temperature water cooling | For low temperature air cooling |
|---|---|---|---|---|
| R134a | 1.65 | 1.25 | 1.81 | 1.41 |
| R407C | 2.59 | 1.99 | 2.89 | 2.29 |
| R410A | 3.59 | 2.75 | 4 | 3.16 |
| R404A | 2.69 | 2.06 | 3 | 2.38 |
| R507A | 2.75 | 2.11 | 3.07 | 2.43 |
| R32 | 3.69 | 2.83 | 4.11 | 3.25 |
| Calculation condition | Te/Tc = −5/65° C. | Te/Tc = −5/55° C. | Te/Tc = −30/65° C. | Te/Tc = −30/55° C. |

As shown in Table 1, in the refrigerating apparatus (100) using the refrigerant of R407C, when a differential pressure of $\Delta p = 2.59$ ($10^7$ dyn/cm$^2$)=2.59 (MPa) was supplied before and after the direct drive type electrically driven expansion valve (Z), the minimum torque T (dyn/cm) that allows normal operation of the valve body that is the needle was measured.

The minimum torque is a minimum value of torque that allows the direct drive type electrically driven expansion valve (Z) to operate without pulse displacement in the pressure range used.

Herein, the torque of the direct drive type electrically driven expansion valve (Z) is ideally measured from the rotor, because an ordinary valve has a structure where the rotor (rotator) is enclosed therein. However, it is difficult to provide a measuring tool inside of an enclosed structure. In addition, an applied pressure may leak outside.

Therefore, the torque of the direct drive type electrically driven expansion valve (Z) is measure in the following manner.

1. The operation voltage and the torque characteristics with respect to a rotor alone are previously measured and stored as a graph.
2. Next, after the direct drive type electrically driven expansion valve (Z) is operated for a predetermined period, it is determined whether or not flow rate errors cause pulse dislocation.
3. The lowest operation voltage immediately before the pulse dislocation is recorded, and the operation torque is obtained from the graph of the above item 1

On the other hand, the minimum torque T of the direct drive type electrically driven expansion valve (Z) can be shown as follows. The following equation can be derived from the balance of the thread to drive the needle.

Equation 1

$$T = (\pi \cdot d^2/4) \cdot \Delta p \cdot D/2 \cdot \tan(P+B) \qquad (1)$$

T: Minimum torque that allows normal operation of the valve body (dyn·cm)

d: Diameter of the expansion valve (cm)

$\Delta p$: Differential pressure (dyn/cm$^2$)

D: Screw effective diameter (cm)

$\tan P = \mu/\cos A'$, $\tan A' = \tan A \cdot \cos B$ $\mu$: Friction factor of a thread surface A: Crank angle of a thread (rad)

B: Lead angle (rad)

The diameter d of the direct drive type electrically driven expansion valve (Z) used in this test is 0.18 (cm), and the differential pressure Δp is 2.59 ($10^7$ dyn/cm$^2$)=2.59 (MPa), the thread effective diameter D is 0.56 (cm). The crank angle A of the thread=15°, and the lead angle B=1.5°.

The values of A and B are substituted in the Equation 1, and the equation is put in order, resulting in an equation as follow.

Equation 2

$$T=(\pi \cdot d^2/4) \cdot \Delta p \cdot (D/2) \cdot (\mu/0.966) \quad (2)$$

Furthermore, this leads to the following equation.

Equation 3

$$\mu = 2 \cdot 0.966 \cdot 4 \cdot T / (\pi \cdot d^2 \cdot \Delta p \cdot D) \quad (3)$$
$$= 2.461 \cdot T / (d^2 \cdot \Delta p \cdot D)$$

The minimum torque T, the needle diameter d, the differential pressure Δp, the thread effective diameter D that are measured by the above-described measuring apparatus are substituted in Equation 3. The friction factor $\mu$ of the thread portion of the direct drive type electrically driven expansion valve (Z) after long durability test can be obtained.

The vertical axis $\mu$ in FIGS. 3 and 4 are obtained by Equation 3. The value of $\mu$ before the test is about 0.2 to 0.3. The graphs indicate that as the oil temperature becomes higher, the value of $\mu$ becomes higher.

From FIGS. 3 and 4, when the oil temperature becomes higher, the temperature of the sliding portion of the compressor (121) becomes higher, so that the amount of the sludge generated in that portion becomes larger. It is indicated that when the amount of mixed impurities is larger, for example, in the case of multi-air conditioners, the friction factor $\mu$ of the direct drive type electrically driven expansion valve (Z) after a long term operation becomes larger. This means that when the amount of the impurities becomes larger, the amount of generated sludge becomes larger.

The characteristics shown in FIGS. 3 and 4 are the most distinguished feature of the present invention. The friction factor $\mu$ becomes higher in the following order: when a low pressure dome type compressor (121) (the low pressure dome of FIGS. 3 and 4) is used; when a first high pressure dome type compressor (121) (the high pressure dome 1 of FIGS. 3 and 4) is used; and a second high pressure dome type compressor (121) (the high pressure dome 2 of FIGS. 3 and 4) is used.

The inventors of the present invention noted that the fact that the friction factor $\mu$ becomes higher in order conventionally has not been considered at all, and newly found that the direct drive type electrically driven expansion valve (Z) can be selected based on the friction factor $\mu$. This is the most important point.

In order to keep the operation of the direct drive type electrically driven expansion valve (Z) normal during the life of an air conditioner, it is necessary to provide previously a driving motor (X) that can generate the torque $T_0$ that overcomes the frictional force of the thread portion represented by the friction factor $\mu$.

The torque $T_0$ is obtained from Equation 3 as follows.

Equation 4

$$T_0 = E \cdot d^2 \cdot \Delta p \cdot D / (2.461) \quad (4)$$

$T_0$: Rating torque (torque that is generated by the driving motor (X) at a rating voltage)

E: Equivalent friction factor on the thread surface (rating torque equivalent friction factor)

E in Equation 4 is the rating torque equivalent friction factor in the present invention, and the rating torque equivalent friction factor E is represented as follows.

Equation 5

$$E = 2.461 \cdot T_0 / (d^2 \cdot \Delta p \cdot D) \quad (5)$$

In this case, the crank angle A and the lead angle B of the thread are the same as those used in this test, but when they are different, the factor of Equation 5 can be changed based on Equation 1.

Therefore, the conditions under which the needle of the direct drive type electrically driven expansion valve (Z) can be driven are as follows:

Equation 6

$$E \geq \mu \quad (6)$$

In Equation 6, how large the rating torque equivalent friction factor E with respect to the friction factor $\mu$ should be depends on how large the safety ratio should be.

Figure 5:
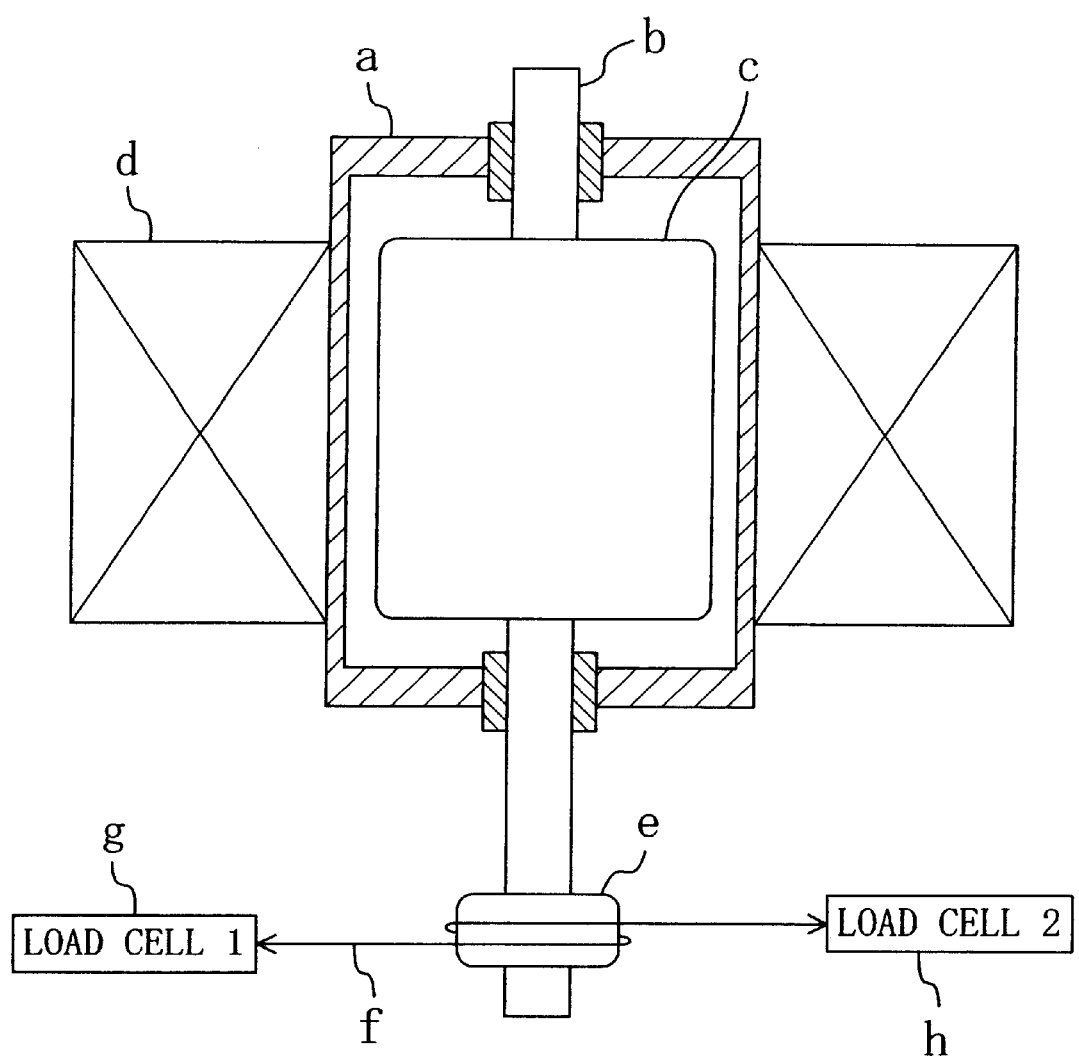
FIG. 5 is a schematic view of an apparatus for measuring torque.

Hereinafter, a method for measuring the rating torque $T_0$ will be described based on FIG. 5. FIG. 5 shows the outline of a measuring apparatus for measuring the torque.

A case a of a measuring apparatus is provided with a shaft b that penetrates the case a, and a rotor c attached to the shaft b is provided in the case a. A coil d is provided outside of the case a. A pulley e is attached to one end of the shaft b, and a first load cell g and a second load cell h are attached to both ends of a string f wound around the pulley e.

As the measurement method by this measuring apparatus, there are pull-out torque measurement and pull-in torque measurement. The pull-out torque measurement is as follows. The tension of the string f wound around the pulley e is increased while rotating the rotor c at a constant speed. Then the tension is measured by the first load cell g and the second load cell h when the pulley e stops rotating. These values are denoted by N1 and N2, and the pull-out torque $T_1$ is calculated based on the following equation.

$$T_1 = |N1-N2| \cdot (D+d)/2$$

D: Outer diameter of the pulley e d: Outer diameter of the string f

The pull-in torque measurement is as follows. After the operation of the pull-out torque measurement is performed, the tension of the string f wound around the pulley e is decreased. Then, the tension is measured by the first load cell g and the second load cell h, when the pulley e that stops starts rotating. These values are denoted by N1' and N2', and the pull-in torque $T_2$ is calculated based on the following equation.

$$T_2 = |N1'-N2'| \cdot (D+d)/2$$

The average value of the pull-out torque $T_1$ and the pull-in torque $T_2$ is defined as the rating torque $T_0$. In reality, the pull-out torque $T_1$ and the pull-in torque $T_2$ are in the same level. In such a case, the smaller torque can be defined as the rating torque $T_0$ for safety. In general, $T_1 > T_2$.

On the other hand, Table 2 shows the rating torque equivalent friction factor E that ensures the reliability of the direct drive type electrically driven expansion valve (Z).

TABLE 2

|  | Pair | | | Multi | | |
| --- | --- | --- | --- | --- | --- | --- |
|  | Threshold | Desirable | Most desirable | Threshold | Desirable | Most desirable |
| Low pressure dome | 0.31 | 0.62 | 0.93 | 0.33 | 0.66 | 0.99 |
| High pressure dome 1 | 0.34 | 0.68 | 1.02 | 0.40 | 0.80 | 1.20 |
| High pressure dome 2 (high oil temperature) | 0.37 | 0.74 | 1.11 | 0.47 | 0.94 | 1.41 |

First, in the refrigerating apparatus (100) that performs various types of vapor compression refrigerating cycle including the refrigerating apparatus (100) shown in FIG. 1 as this embodiment of the present invention, the direct drive type electrically driven expansion valve (Z) is set based on the rating torque equivalent friction factor E.

In this case, for various refrigerating apparatuses including the refrigerating apparatus (100) shown in FIG. 1 that includes the compressor (121), the heat source side heat exchanger (123) such as an external heat exchanger, the direct drive type electrically driven expansion valve (Z), and the heat application side heat exchanger (131) such as an internal heat exchanger, the rating torque equivalent friction factor E of the direct drive type electrically driven expansion valve (Z) can be set to 0.31 or more.

Furthermore, in the installation work of air conditioners or the like, rain drops are mixed in the pipe so that the water content is increased abnormally, the vacuum pump is old so that the vacuum degree is insufficient, and thus moisture or air is mixed with the refrigerant system. In addition, brazing is performed without purging with nitrogen, and powder of copper oxide is circulated in the refrigerant system and attached to the inside of the direct drive type electrically driven expansion valve (Z).

There are some factors that facilitate clogging of the direct drive type electrically driven expansion valve (Z). For example, a voltage that acts on the driving motor (X) of the direct drive type electrically driven expansion valve (Z) is lowered, or the direct drive type electrically driven expansion valve (Z) itself is non-uniform.

As a result of tests that were conducted with respect to these factors, it seems that when the safety factor is 2 or more, the operation of the direct drive type electrically driven expansion valve (Z) can be maintained. Therefore, it is desirable to set the safety factor to 2 or more to maintain the reliability with respect to various non-uniformity factors.

Furthermore, to update an apparatus employing a R22 refrigerant to an apparatus employing a HFC refrigerant, it is impossible to use an existing refrigerant pipe that already has been installed without any process. This is because when mineral oil or impurities in the existing pipe are mixed with the HFC refrigerant, the direct drive type electrically driven expansion valve (Z) clogs. In such a case, according to the results of evaluating the clogging of the direct drive type electrically driven expansion valve (Z), a safety factor of 2 can maintain the operation of the direct drive type electrically driven expansion valve (Z).

Furthermore, for example, in the case where the life of the compressor (121) of the refrigerating apparatus (100) that is an existing air conditioner is ended by burning damages, carbonated refrigerating machine oil in the burning damaged compressor (121) or an abrasion remains in the existing pipe. Therefore, the torque of the direct drive type electrically driven expansion valve (Z) is required to be increased. Therefore, it is desirable to set the safety factor to 3 or more to maintain the reliability when the existing pipe is used.

When the type of the refrigerant based on HFC, the valve diameter, the differential pressure, the thread effective diameter, or the temperature is changed, it is time-consuming and costly to confirm the reliability of the direct drive type electrically driven expansion valve (Z) by conducting long term durability tens for each change, and in fact, that is impossible.

However, the rating torque $T_0$ necessary for driving is obtained based on the rating torque equivalent friction factor E of Table 2 from Equation 4. If the direct drive type electrically driven expansion valve (Z) or the driving motor (X) is designed in such a manner that this rating torque $T_0$ is generated, a highly reliable voltage expansion valve easily can be set in accordance with various capacities with various refrigerants.

In the tests shown in FIGS. 3 and 4, 1% of an extreme-pressure additive is added to the refrigerating machine oil. The extreme-pressure additive is added for the purpose of preventing the sliding portion of the compressor (121) from being burned when metallic contact occurs. However, it is known that when the amount of the added additive is large, the additive itself forms sludge, and causes clogging of the expansion valve. When the added amount is 0.3% or more, the sludge caused by the extreme-pressure additive contributes clogging. When the added amount is more than 1%, most of the extreme-pressure additive results in sludge.

It is desirable to use the direct drive type electrically driven expansion valve (Z) of the present invention together with a refrigerating machine oil containing an amount of not more than 1% of the extreme-pressure additive. Furthermore, when the added amount exceeds 0.3%, the effect thereof is larger than that provided by the amounts smaller than that.

In the refrigerating apparatus (100) for a low temperature, the vapor temperature is lower than that of an air conditioning apparatus, and therefore the discharge temperature is higher. In the case where the high pressure dome type compressor (121) is provided, when the discharge temperature is high, the temperature of the refrigerating machine oil is high as well. As a result, a large amount of sludge is generated. Therefore, in such a refrigerating apparatus (100), it is necessary to select the rating torque equivalent friction factor E for the case where the oil temperature of the high pressure dome type compressor (121) is high.

Furthermore, the permanent magnet (4) of the driving motor (X) may be formed of ferrite or rare earth. Rare earth loses magnetism (demagnetization) when it reaches a predetermined temperature or more. Therefore, when a refrigerant having a high discharge temperature such as R32 is used, it is preferable to use ferrite.

Furthermore, the magnetism of rare earth is larger than that of ferrite, and is characterized by being capable of generating a large torque. Therefore, in the case where the direct drive type electrically driven expansion valve (Z) is used at a temperature that is not increased to high temperature, making the torque large by using a rare earth magnet leads to improvement of the reliability. In the case where a refrigerant having a high temperature such as R32 is used, it is preferable to use a rare earth magnet having a demagnetization temperature of 130° C. or more to enhance the heat resistance.

Effects of the Embodiment

As described above, this embodiment easily can solve clogging of the direct drive type electrically driven expansion valve (Z) regardless of the type of the refrigerant.

In other words, the present invention is directed to a totally new design approach of the driving motor (X) and the thread portion of the direct drive type electrically driven expansion valve (Z), and the direct drive type electrically driven expansion valve (Z) that can realize reliable driving without wastefulness can be provided.

In particular, when a HFC refrigerant is used, the clogging of the direct drive type electrically driven expansion valve (Z) easily can be prevented in each embodiment of the refrigerant type. the use temperature, the capacity of the air conditioner, and the pair- or the multi-type.

In the case where a currently used refrigerant such as R407C, R410A and R134a is used, the direct drive type electrically driven expansion valve (Z) can be designed very easily. In particular, when other refrigerants such as R32 are used, the direct drive type electrically driven expansion valve (Z) also can be designed very easily.

Furthermore, it is quantitatively grasped that as the temperature of the refrigerating machine oil is higher, the clogging substance is generated in a larger amount, and the degree of clogging becomes larger. As a result, the direct drive type electrically driven expansion valve (Z) can be designed in the accordance with the temperature. Therefore, the present invention can solve the problem of clogging of the expansion valve caused by using a refrigerant of R32 alone or a mixed refrigerant containing a large amount of R32 that increases the discharge temperature and the temperature of the refrigerating machine oil. Furthermore, in a refrigerating apparatus for low temperature in which the discharge temperature is high, the direct drive type electrically driven expansion valve (Z) can be designed very easily.

In a mixed refrigerant containing a large amount of R32, when R32 exceeds 50 wt %, the discharge temperature becomes high. For example, for R32/125 (R32 is at least 70%), R32/134a (R32 is at least 50%), R32/propane (R32 is at least 80%), R32/butane (R32 is at least 80%), and R32/isobutane (R32 is at least 80%), the discharge is more than 10° C. higher than that of R22. For such refrigerants, optimum design for the direct drive type electrically driven expansion valve (Z) can be achieved very easily.

Furthermore, in the case where a refrigerant with a low temperature is used, on the other hand, it is possible to design a proper direct drive type electrically driven expansion valve (Z), so that excess design that might occur because of an emphasis on reliability of the direct drive type electrically driven expansion valve (Z) can be prevented.

Furthermore, when an existing pipe is used, it is conventionally necessary to clean the pipe in order to remove mineral oil or impurities remaining in the pipe. However, since the present invention allows proper design of the direct drive type electrically driven expansion valve (Z), so that the existing pipe can be utilized without pipe cleaning. As a result, the cost for installation work can be reduced and the term for the work can be shortened.

EXAMPLES

Next, specific examples of the direct drive type electrically driven expansion valve (Z) will be described based on the above-described principle of the setting of the direct drive type electrically driven expansion valve (Z). The reference numerals in the examples corresponds to those in FIG. 1.

Example 1

This example is a refrigerating apparatus (100) including the low pressure dome type compressor (121), the direct drive type electrically driven expansion valve (Z), the heat source side heat exchanger (123) and the heat application side heat exchanger (131), the heat source side heat exchanger (123) and the heat application side heat exchanger (131) corresponding to each other one-to-one. When a refrigerant based on HFC is used, the rating torque equivalent friction factor E of the direct drive type electrically driven expansion valve (Z) is set to 0.31 or more and less than 0.62.

Example 2

This example is a refrigerating apparatus (100) including the high pressure dome type compressor (121), the direct drive type electrically driven expansion valve (Z), the heat source side heat exchanger (123) and the heat application side heat exchanger (131), the heat source side heat exchanger (123) and the heat application side heat exchanger (131) corresponding to each other one-to-one. When a refrigerant having a discharge temperature in the same level as R22 or higher is used, the rating torque equivalent friction factor E of the direct drive type electrically driven expansion valve (Z) is set to 0.34 or more and less than 0.68.

Example 3

This example is a refrigerating apparatus (100) including the high pressure dome type compressor (121), the direct drive type electrically driven expansion valve (Z), the heat source side heat exchanger (123) and the heat application side heat exchanger (131), the heat source side heat exchanger (123) and the heat application side heat exchanger (131) corresponding to each other one-to-one. When a refrigerant of R32 alone or a R32 rich mixture comprising an amount of more than 50 wt % of R32 is used, the rating torque equivalent friction factor E of the direct drive type electrically driven expansion valve (Z) is set to 0.37 or more and less than 0.74.

Example 4

This example is a refrigerating apparatus (100) including the high pressure dome type compressor (121), the direct drive type electrically driven expansion valve (Z), the heat source side heat exchanger (123) and the heat application side heat exchanger (131), the heat source side heat exchanger (123) and the heat application side heat exchanger (131) corresponding to each other one-to-one. When a R32 rich mixture refrigerant having a discharge temperature of more than about 10° C. higher than that of R22 is used, the rating torque equivalent friction factor E of the direct drive type electrically driven expansion valve (Z) is set to 0.37 or more and less than 0.74.

Example 5

This example is a refrigerating apparatus (100) including the high pressure dome type compressor (121), the direct drive type electrically driven expansion valve (Z), the heat source side heat exchanger (123) and the heat application side heat exchanger (131), the heat source side heat exchanger (123) and the heat application side heat exchanger (131) corresponding to each other one-to-one. When a refrigerant based on HFC is used, the rating torque equivalent friction factor E of the direct drive type electrically driven expansion valve (Z) is set to 0.37 or more and less than 0.74.

Example 6

This example is a refrigerating apparatus (100) including the low pressure dome type compressor (121), the direct drive type electrically driven expansion valve (Z), the heat source side heat exchanger (123) and the heat application side heat exchanger (131), the heat source side heat exchanger (123) and the heat application side heat exchanger (131) corresponding to each other one-to-one. When a refrigerant based on HFC is used, the rating torque equivalent friction factor E of the direct drive type electrically driven expansion valve (Z) is set to 0.62 or more and less than 0.93.

Example 7

This example is a refrigerating apparatus (100) including the high pressure dome type compressor (121), the direct drive type electrically driven expansion valve (Z), the heat source side heat exchanger (123) and the heat application side heat exchanger (131), the heat source side heat exchanger (123) and the heat application side heat exchanger (131) corresponding to each other one-to-one. When a refrigerant having a discharge temperature in the same level as R22 or higher is used, the rating torque equivalent friction factor E of the direct drive type electrically driven expansion valve (Z) is set to 0.68 or more and less than 1.02.

Example 8

This example is a refrigerating apparatus (100) including the high pressure dome type compressor (121), the direct drive type electrically driven expansion valve (Z), the heat source side heat exchanger (123) and the heat application side heat exchanger (131), the heat source side heat exchanger (123) and the heat application side heat exchanger (131) corresponding to each other one-to-one. When a refrigerant of R32 alone or a R32 rich mixture comprising an amount of more than 50 wt % of R32 is used, the rating torque equivalent friction factor E of the direct drive type electrically driven expansion valve (Z) is set to 0.74 or more and less than 1.11.

Example 9

This example is a refrigerating apparatus (100) including the high pressure dome type compressor (121), the direct drive type electrically driven expansion valve (Z), the heat source side heat exchanger (123) and the heat application side heat exchanger (131), the heat source side heat exchanger (123) and the heat application side heat exchanger (131) corresponding to each other one-to-one. When a R32 rich mixture refrigerant having a discharge temperature of more than about 10C higher than that of R22 is used, the rating torque equivalent friction factor E of the direct drive type electrically driven expansion valve (Z) is set to 0.74 or more and less than 1.11.

Example 10

This example is a refrigerating apparatus (100) including the low pressure dome type compressor (121), the direct drive type electrically driven expansion valve (Z), the heat source side heat exchanger (123) and the heat application side heat exchanger (131), the heat source side heat exchanger (123) and the heat application side heat exchanger (131) corresponding to each other one-to-one. When a refrigerant based on HFC is used, the rating torque equivalent friction factor E of the direct drive type electrically driven expansion valve (Z) is set to 0.74 or more and less than 1.11.

Example 11

This example is a refrigerating apparatus (100) including the low pressure dome type compressor (121), the direct drive type electrically driven expansion valve (Z), the heat source side heat exchanger (123) and the heat application side heat exchanger (131), the heat source side heat exchanger (123) and the heat application side heat exchanger (131) corresponding to each other one-to-one. When a refrigerant based on HFC is used, the rating torque equivalent friction factor E of the direct drive type electrically driven expansion valve (Z) is set to 0.93 or more.

Example 12

This example is a refrigerating apparatus (100) including the high pressure dome type compressor (121), the direct drive type electrically driven expansion valve (Z), the heat source side heat exchanger (123) and the heat application side heat exchanger (131), the heat source side heat exchanger (123) and the heat application side heat exchanger (131) corresponding to each other one-to-one. When a refrigerant having a discharge temperature in the same level as R22 or higher is used, the rating torque equivalent friction factor E of the direct drive type electrically driven expansion valve (Z) is set to 1.02 or more.

Example 13

This example is a refrigerating apparatus (100) including the high pressure dome type compressor (121), the direct drive type electrically driven expansion valve (Z), the heat source side heat exchanger (123) and the heat application side heat exchanger (131), the heat source side heat exchanger (123) and the heat application side heat exchanger (131) corresponding to each other one-to-one. When a refrigerant of R32 alone or a R32 rich mixture comprising an amount of more than 50 wt % of R32 is used, the rating torque equivalent friction factor E of the direct drive type electrically driven expansion valve (Z) is set to 1.11 or more.

Example 14

This example is a refrigerating apparatus (100) including the high pressure dome type compressor (121), the direct drive type electrically driven expansion valve (Z), the heat source side heat exchanger (123) and the heat application side heat exchanger (131), the heat source side heat exchanger (123) and the heat application side heat exchanger (131) corresponding to each other one-to-one. When a R32 rich mixture refrigerant having a discharge temperature of more than about 10° C. higher than that of R22 is used, the rating torque equivalent friction factor E of the direct drive type electrically driven expansion valve (Z) is set to 1.11 or more.

Example 15

This example is a refrigerating apparatus (100) including the high pressure dome type compressor (121), the direct drive type electrically driven expansion valve (Z), the heat source side heat exchanger (123) and the heat application side heat exchanger (131), the heat source side heat exchanger (123) and the heat application side heat exchanger (131) corresponding to each other one-to-one. When a refrigerant based on HFC is used, the rating torque equivalent friction factor E of the direct drive type electrically driven expansion valve (Z) is set to 1.11 or more.

Example 16

This example is a refrigerating apparatus (100) including the low pressure dome type compressor (121), the direct drive type electrically driven expansion valve (Z), the heat source side heat exchanger (123) and the heat application side heat exchanger (131), one or both of the heat source side heat exchanger (123) and the heat application side heat exchanger (131) being constituted by a plurality of heat exchangers. When a refrigerant based on HFC is used, the rating torque equivalent friction factor E of the direct drive type electrically driven expansion valve (Z) is set to 0.33 or more and less than 0.66.

Example 17

This example is a refrigerating apparatus (100) including the high pressure dome type compressor (121), the direct drive type electrically driven expansion valve (Z), the heat source side heat exchanger (123) and the heat application side heat exchanger (131), one or both of the heat source side heat exchanger (123) and the heat application side heat exchanger (131) being constituted by a plurality of heat exchangers. When a refrigerant having a discharge temperature in the same level as R22 or higher is used, the rating torque equivalent friction factor E of the direct drive type electrically driven expansion valve (Z) is set to 0.40 or more and less than 0.80.

Example 18

This example is a refrigerating apparatus (100) including the high pressure dome type compressor (121), the direct drive type electrically driven expansion valve (Z), the heat source side heat exchanger (123) and the heat application side heat exchanger (131), one or both of the heat source side heat exchanger (123) and the heat application side heat exchanger (131) being constituted by a plurality of heat exchangers. When a refrigerant of R32 alone or a R32 rich mixture comprising an amount of more than 50 wt % of R32 is used, the rating torque equivalent friction factor E of the direct drive type electrically driven expansion valve (Z) is set to 0.47 or more and less than 0.94.

Example 19

This example is a refrigerating apparatus (100) including the high pressure dome type compressor (121), the direct drive type electrically driven expansion valve (Z), the heat source side heat exchanger (123) and the heat application side heat exchanger (131), one or both of the heat source side heat exchanger (123) and the heat application side heat exchanger (131) being constituted by a plurality of heat exchangers. When a R32. rich mixture refrigerant having a discharge temperature of more than about 10° C. higher than that of R22 is used, the rating torque equivalent friction factor E of the direct drive type electrically driven expansion valve (Z) is set to 0.47 or more and less than 0.94.

Example 20

This example is a refrigerating apparatus (100) including the high pressure dome type compressor (121), the direct drive type electrically driven expansion valve (Z), the heat source side heat exchanger (123) and the heat application side heat exchanger (131), one or both of the heat source side heat exchanger (123) and the heat application side heat exchanger (131) being constituted by a plurality of heat exchangers. When a refrigerant based on HFC is used, the rating torque equivalent friction factor E of the direct drive type electrically driven expansion valve (Z) is set to 0.47 or more and less than 0.94.

Example 21

This example is a refrigerating apparatus (100) including the low pressure dome type compressor (121), the direct drive type electrically driven expansion valve (Z), the heat source side heat exchanger (123) and the heat application side heat exchanger (131), one or both of the heat source side heat exchanger (123) and the heat application side heat exchanger (131) being constituted by a plurality of heat exchangers. When a refrigerant based on HFC is used, the rating torque equivalent friction factor E of the direct drive type electrically driven expansion valve (Z) is set to 0.66 or more and less than 0.99

Example 22

This example is a refrigerating apparatus (100) including the high pressure dome type compressor (121), the direct drive type electrically driven expansion valve (Z), the heat source side heat exchanger (123) and the heat application side heat exchanger (131), one or both of the heat source side heat exchanger (123) and the heat application side heat exchanger (131) being constituted by a plurality of heat exchangers. When a refrigerant having a discharge temperature in the same level as R22 or higher is used, the rating torque equivalent friction factor E of the direct drive type electrically driven expansion valve (Z) is set to 0.80 or more and less than 1.20.

Example 23

This example is a refrigerating apparatus (100) including the high pressure dome type compressor (121), the direct drive type electrically driven expansion valve (Z), the heat source side heat exchanger (123) and the heat application side heat exchanger (131), one or both of the heat source side heat exchanger (123) and the heat application side heat exchanger (131) being constituted by a plurality of heat exchangers. When a refrigerant of R32 alone or a R32 rich mixture comprising an amount of more than 50 wt % of R32 is used, the rating torque equivalent friction factor E of the direct drive type electrically driven expansion valve (Z) is set to 0.94 or more less than 1.41.

Example 24

This example is a refrigerating apparatus (100) including the high pressure dome type compressor (121), the direct drive type electrically driven expansion valve (Z), the heat source side heat exchanger (123) and the heat application side heat exchanger (131), one or both of the heat source side heat exchanger (123) and the heat application side heat exchanger (131) being constituted by a plurality of heat exchangers. When a R32 rich mixture refrigerant having a discharge temperature of more than about 10° C. higher than that of R22 is used, the rating torque equivalent friction factor E of the direct drive type electrically driven expansion valve (Z) is set to 0.94 or more and less than 1.41.

Example 25

This example is a refrigerating apparatus (100) including the high pressure dome type compressor (121), the direct drive type electrically driven expansion valve (Z), the heat source side heat exchanger (123) and the heat application side heat exchanger (131), one or both of the heat source side heat exchanger (123) and the heat application side heat exchanger (131) being constituted by a plurality of heat exchangers. When a refrigerant based on HFC is used, the rating torque equivalent friction factor E of the direct drive type electrically driven expansion valve (Z) is set to 0.94 or more and less than 1.41.

Example 26

This example is a refrigerating apparatus (100) including the low pressure dome type compressor (121), the direct drive type electrically driven expansion valve (Z), the heat source side heat exchanger -(123) and the heat application side heat exchanger (131), one or both of the heat source side heat exchanger (123) and the heat application side heat exchanger (131) being constituted by a plurality of heat exchangers. When a refrigerant based on HFC is used, the rating torque equivalent friction factor E of the direct drive type electrically driven expansion valve (Z) is set to 0.99 or more.

Example 27

This example is a refrigerating apparatus (100) including the high pressure dome type compressor (121), the direct drive type electrically driven expansion valve (Z), the heat source side heat exchanger (123) and the heat application side heat exchanger (131), one or both of the heat source side heat exchanger (123) and the heat application side heat exchanger (131) being constituted by a plurality of heat exchangers. When a refrigerant having a discharge temperature in the same level as R22 or higher is used, the rating torque equivalent friction factor E of the direct drive type electrically driven expansion valve (Z) is set to 1.20 or more.

Example 28

This example is a refrigerating apparatus (100) including the high pressure dome type compressor (121), the direct drive type electrically driven expansion valve (Z), the heat source side heat exchanger (123) and the heat application side heat exchanger (131), one or both of the heat source side heat exchanger (123) and the heat application side heat exchanger (131) being constituted by a plurality of heat exchangers. When a refrigerant of R32 alone or a R32 rich mixture comprising an amount of more than 50 wt % of R32 is used, the rating torque equivalent friction factor E of the direct drive type electrically driven expansion valve (Z) is set to 1.41 or more.

Example 29

This example is a refrigerating apparatus (100) including the high pressure dome type compressor (121), the direct drive type electrically driven expansion valve (Z), the heat source side heat exchanger (123) and the heat application side heat exchanger (131), one or both of the heat source side heat exchanger (123) and the heat application side heat exchanger (131) being constituted by a plurality of heat exchangers. When a R32 rich mixture refrigerant having a discharge temperature of more than about 10° C. higher than that of R22 is used, the rating torque equivalent friction factor E of the direct drive type electrically driven expansion valve (Z) is set to 1.41 or more.

Example 30

This example is a refrigerating apparatus (100) including the high pressure dome type compressor (121), the direct drive type electrically driven expansion valve (Z), the heat source side heat exchanger (123) and the heat application side heat exchanger (131), one or both of the heat source side heat exchanger (123) and the heat application side heat exchanger (131) being constituted by a plurality of heat exchangers. When a refrigerant based on HFC is used, the rating torque equivalent friction factor E of the direct drive type electrically driven expansion valve (Z) is set to 1.41 or more.

Example 31

In the above-examples, the refrigerant may be R134a, R407C, R410A, R404A or R507A.

Furthermore, the R32 rich mixture refrigerant having a discharge temperature of more than about 10° C. higher than that of R22 may be R32/125 (R32 is at least 70%), R32/134a (R32 is at least 50%), R32/propane (R32 is at least 80%), R32/butane (R32 is at least 80%), or R32/isobutane (R32 is at least 80%).

Example 32

The refrigerating apparatus (100) in the above-examples may utilize an existing pipe.

Example 33

The refrigerating machine oil in the above-examples may be oil based on polyvinyl ether, polyol ester, carbonic acid ester, alkylbenzene, or mineral oil, or may be based on polyvinyl ether, polyol ester or carbonic acid ester and mixed with alkylbenzene or mineral oil. The concentration of the extreme-pressure additive in the refrigerating machine oil may be 0.3 or more and less than 1% by weight (refrigerating machine oil weight ratio).

Example 34

When the mixed refrigerant of R32 alone or R32 rich mixture comprising an amount of more than 50 wt % of R32 is used, the permanent magnet (4) of the driving motor (X) of the direct drive type electrically driven expansion valve (Z) may be a ferrite magnet.

Furthermore, the permanent magnet (4) of the driving motor (X) of the direct drive type electrically driven expansion valve (Z) may be a rare earth magnet.

Furthermore, the permanent magnet (4) of the driving motor (X) of the direct drive type electrically driven expansion valve (Z) may be a rare earth magnet having a demagnetization temperature of 130° C. or more.

Furthermore, when the mixed refrigerant of R32 alone or R32 rich mixture comprising 50 wt % of R32 is used, the permanent magnet (4) of the driving motor (X) of the direct drive type electrically driven expansion valve (Z) may be a rare earth magnet having a demagnetization temperature of 130° C. or more.

Furthermore, the permanent magnet (4) of the driving motor (X) of the direct drive type electrically driven expansion valve (Z) may be formed of an anisotropic magnetic material.

Furthermore, the thread surface of the direct drive type electrically driven expansion valve (Z) may be coated with a fluorine resin. Furthermore, a solid lubricant is applied onto the thread surface of the direct drive type electrically driven expansion valve (Z).

Example 35

This example is a refrigerating apparatus (100) including the low pressure dome type compressor (121), the direct drive type electrically driven expansion valve (Z), the heat source side heat exchanger (123) and the heat application side heat exchanger (131), the heat source side heat exchanger (123) and the heat application side heat exchanger (131) corresponding to each other one-to-one. When a refrigerant based on hydrocarbon is used, the rating torque equivalent friction factor E of the direct drive type electrically driven expansion valve (Z) is set to 0.31 or more and less than 0.62.

In other words, this is set based on the following reason. Since a hydrocarbon based refrigerant such as propane, butane, isobutane contains no chlorine, it has no self-lubricating property, so that sludge may be generated readily in a severe lubrication state. The following examples are based on the same reason.

Example 36

This example is a refrigerating apparatus (100) including the high pressure dome type compressor (121), the direct drive type electrically driven expansion valve (Z), the heat source side heat exchanger (123) and the heat application side heat exchanger (131), the heat source side heat exchanger (123) and the heat application side heat exchanger (131) corresponding to each other one-to-one. When a refrigerant based on hydrocarbon is used, the rating torque equivalent friction factor E of the direct drive type electrically driven expansion valve (Z) is set to 0.34 or more and less than 0.68.

Example 37

This example is a refrigerating apparatus (100) including the low pressure dome type compressor (121), the direct drive type electrically driven expansion valve (Z), the heat source side heat exchanger (123) and the heat application side heat exchanger (131), the heat source side heat exchanger (123) and the heat application side heat exchanger (131) corresponding to each other one-to-one. When a refrigerant based on hydrocarbon is used, the rating torque equivalent friction factor E of the direct drive type electrically driven expansion valve (Z) is set to 0.62 or more and less than 0.93.

Example 38

This example is a refrigerating apparatus (100) including the high pressure dome type compressor (121), the direct drive type electrically driven expansion valve (Z), the heat source side heat exchanger (123) and the heat application side heat exchanger (131), the heat source side heat exchanger (123) and the heat application side heat exchanger (131) corresponding to each other one-to-one. When a refrigerant based on hydrocarbon is used, the rating torque equivalent friction factor E of the direct drive type electrically driven expansion valve (Z) is set to 0.68 or more and less than 1.02.

Example 39

This example is a refrigerating apparatus (100) including the low pressure dome type compressor (121), the direct drive type electrically driven expansion valve (Z), the heat source side heat exchanger (123) and the heat application side heat exchanger (131), the heat source side heat exchanger (123) and the heat application side heat exchanger (131) corresponding to each other one-to-one. When a refrigerant based on hydrocarbon is used, the rating torque equivalent friction factor E of the direct drive type electrically driven expansion valve (Z) is set to 0.93 or more.

Example 40

This example is a refrigerating apparatus (100) including the high pressure dome type compressor (121), the direct drive type electrically driven expansion valve (Z), the heat source side heat exchanger (123) and the heat application side heat exchanger (131), the heat source side heat exchanger (123) and the heat application side heat exchanger (131) corresponding to each other one-to-one. When a refrigerant based on hydrocarbon is used, the rating torque equivalent friction factor E of the direct drive type electrically driven expansion valve (Z) is set to 1.02 or more.

Example 41

This example is a refrigerating apparatus (100) including the low pressure dome type compressor (121), the direct drive type electrically driven expansion valve (Z), the heat source side heat exchanger (123) and the heat application side heat exchanger (131), one or both of the heat source side heat exchanger (123) and the heat application side heat exchanger (131) being constituted by a plurality of heat exchangers. When a refrigerant based on hydrocarbon is used, the rating torque equivalent friction factor E of the direct drive type electrically driven expansion valve (Z) is set to 0.33 or more and less than 0.66.

Example 42

This example is a refrigerating apparatus (100) including the high pressure dome type compressor (121), the direct drive type electrically driven expansion valve (Z), the heat source side heat exchanger (123) and the heat application side heat exchanger (131), one or both of the heat source side heat exchanger (123) and the heat application side heat exchanger (131) being constituted by a plurality of heat exchangers. When a refrigerant based on hydrocarbon is used, the rating torque equivalent friction factor E of the direct drive type electrically driven expansion valve (Z) is set to 0.40 or more and less than 0.80.

Example 43

This example is a refrigerating apparatus (100) including the low pressure dome type compressor (121), the direct drive type electrically driven expansion valve (Z), the heat source side heat exchanger (123) and the heat application side heat exchanger (131), one or both of the heat source side heat exchanger (123) and the heat application side heat exchanger (131) being constituted by a plurality of heat exchangers. When a refrigerant based on hydrocarbon is used, the rating torque equivalent friction factor E of the direct drive type electrically driven expansion valve (Z) is set to 0.66 or more and less than 0.99.

Example 44

This example is a refrigerating apparatus (100) including the high pressure dome type compressor (121), the direct drive type electrically driven expansion valve (Z), the heat source side heat exchanger (123) and the heat application side heat exchanger (131), one or both of the heat source side heat exchanger (123) and the heat application side heat exchanger (131) being constituted by a plurality of heat exchangers. When a refrigerant based on hydrocarbon is used, the rating torque equivalent friction factor E of the direct drive type electrically driven expansion valve (Z) is set to 0.80 or more and less than 1.20.

Example 45

This example is a refrigerating apparatus (100) including the low pressure dome type compressor (121), the direct drive type electrically driven expansion valve (Z), the heat source side heat exchanger (123) and the heat application side heat exchanger (131), the heat source side heat exchanger (123) and the heat application side heat exchanger (131) corresponding to each other one-to-one. When a refrigerant based on hydrocarbon is used, the rating torque equivalent friction factor E of the direct drive type electrically driven expansion valve (Z) is set to 0.99 or more.

Example 46

This example is a refrigerating apparatus (100) including the high pressure dome type compressor (121), the direct drive type electrically driven expansion valve (Z), the heat source side heat exchanger (123) and the heat application side heat exchanger (131), one or both of the heat source side heat exchanger (123) and the heat application side heat exchanger (131) being constituted by a plurality of heat exchangers. When a refrigerant based on hydrocarbon is used, the rating torque equivalent friction factor E of the direct drive type electrically driven expansion valve (Z) is set to 1.20 or more.

Example 47

The refrigerating apparatus (100) using the refrigerant based on hydrocarbon may utilize an existing pipe.

Example 48

When the refrigerant based on hydrocarbon is used, the refrigerating machine oil may be oil based on alkylbenzene or mineral oil, and the concentration of the extreme-pressure additive in the refrigerating machine oil may be 0.3 or more and less than 1% by weight (refrigerating machine oil weight ratio).

Example 49

In the case where the refrigerant based on hydrocarbon is used, the permanent magnet (4) of the driving motor (X) of the direct drive type electrically driven expansion valve (Z) may be a ferrite magnet. Furthermore, the permanent magnet (4) of the driving motor (X) of the direct drive type electrically driven expansion valve (Z) may be a rare earth magnet. The permanent magnet (4) of the driving motor (X) of the direct drive type electrically driven expansion valve (Z) may be formed of an anisotropic magnetic material. The thread surface of the direct drive type electrically driven expansion valve (Z) may be coated with a fluorine resin. A solid lubricant may be applied onto the thread surface of the direct drive type electrically driven expansion valve (Z).

Other Embodiments of the Present Invention

Figure 6:
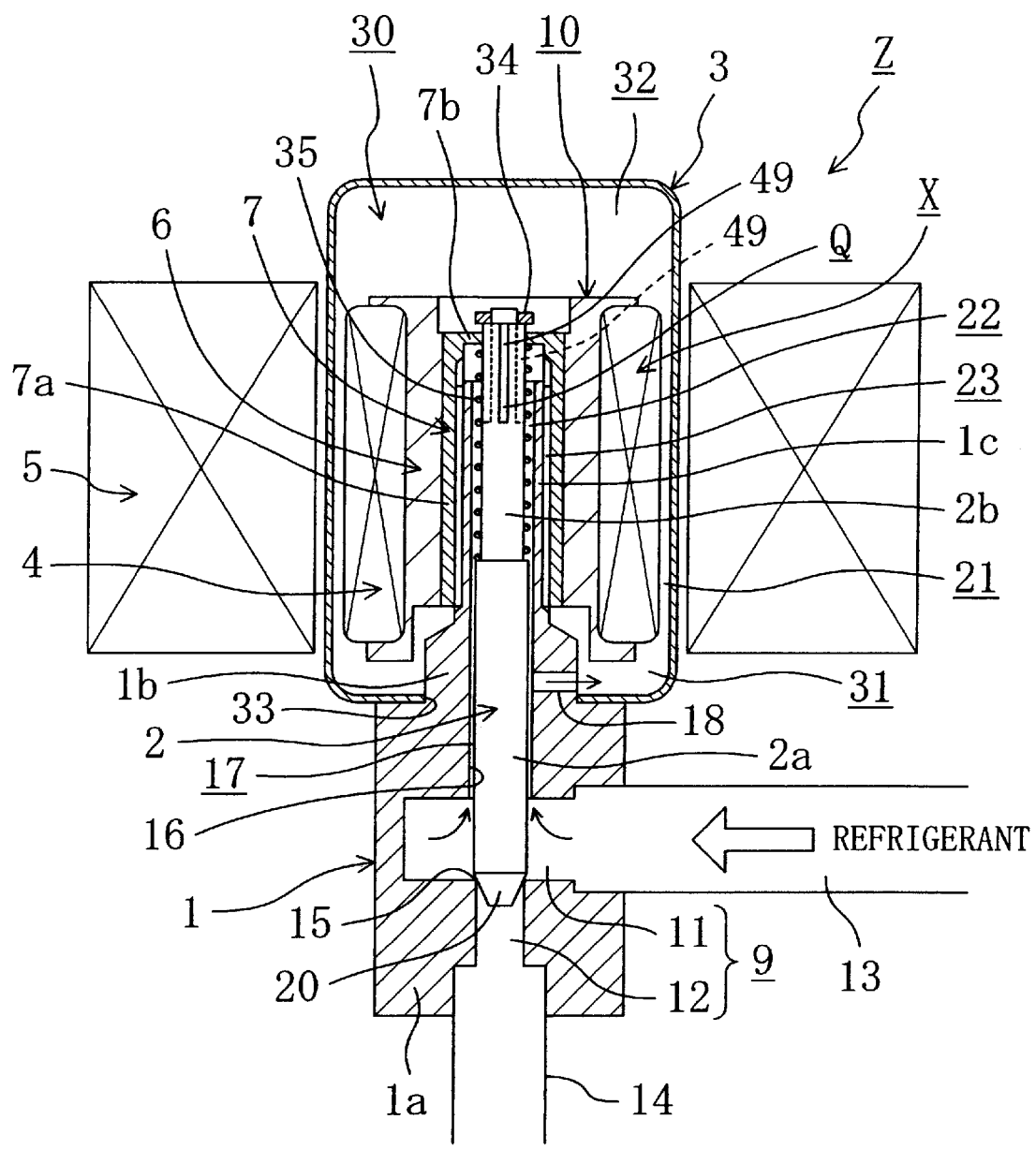
FIG. 6 is a cross-sectional view showing the main portion of another electrically driven expansion valve

FIG. 6 shows another electrically driven expansion valve (Z). The electrically driven expansion valve (Z) is directed to preventing sludge from being attached to the thread gap (23), instead of using the means (P) for lowering the flow rate of the refrigerant of FIG. 2.

More specifically, in the electrically driven expansion valve (Z), when the needle (2) is in the total closing state, the rotor portion (10) moves downward against the force of the spring (35) in order to apply a predetermined force to the needle (2) in the closing direction, and is displaced relatively to the needle (2). As a result, a predetermined gap is generated between the stopping member (34) provided in the end portion of the supporting shaft portion (2b) of the needle (2) and the end face portion (7b) of the thread forming portion (7), and the end portion of the supporting shaft portion (2b) protrudes into the second space (32). Utilizing this protrusion, a refrigerant passage (49) that is means (Q) for lowering the flow rate of the refrigerant constituted by a plurality of vertical grooves is formed on the outer circumferential surface of the needle (2) on the side of the end of the supporting shaft portion (2b).

An equalizing hole (18) having a predetermined diameter that communicates the needle insert gap (17) passing through the shaft center of the valve body (1) with the first space (31) of the case (3) is formed in the shoulder portion (1b) of the valve body (1).

According to such an embodiment, in the total closing state of the needle (2), the needle insert gap (17) is in communication with the second space (32) through the refrigerant passages (49, 50) on the upper side thereof, that is, on the communication side with the thread gap (23). Thus, most of the refrigerant that flows up through the needle insert gap (17) directly flows into the second space (32) through the refrigerant passage (49) having a smaller passage resistance, so that the flow rate of the refrigerant on the thread gap (23) side is decreased relatively.

As a result, even if a valve that allows generation of sludge in a large amount, sludge attachment can be prevented in the narrow thread gap (23) as much as possible, so that a proper operation (rotation movement and shaft direction movement) of the rotor portion (10), and thus a proper operation of the direct drive type electrically driven expansion valve (Z) can be ensured. For this reason, in the refrigerating apparatus (100) provided with the electrically driven expansion valve (Z), abnormal liquid compression or generation of superheat in the compressor (121) can be prevented, and high reliability in terms of the operation can be obtained. The configuration other than that, the functions and the effects are the same as those of the electrically driven expansion valve (Z) of FIG. 2.

Figure 7:
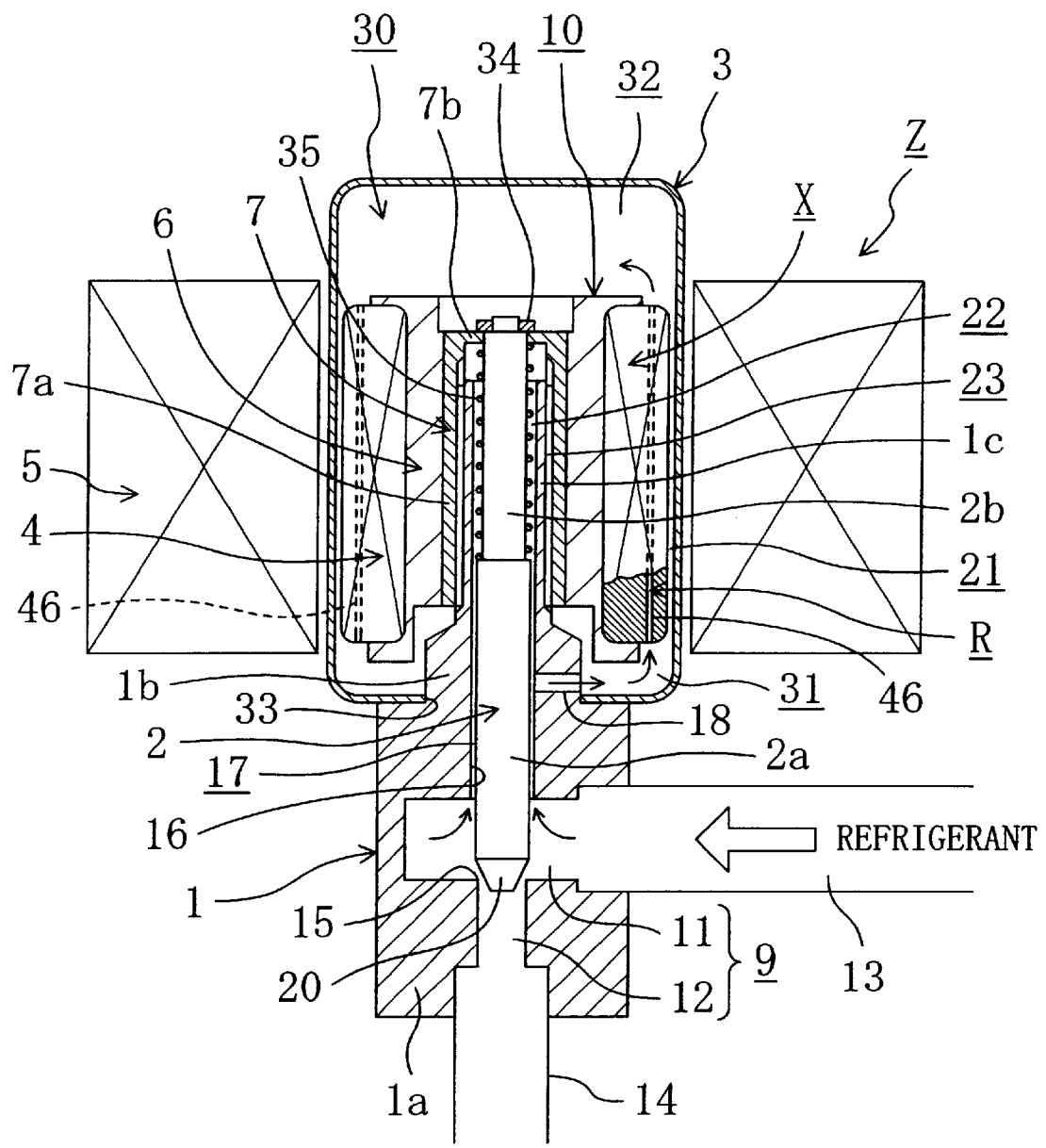
FIG. 7 is a cross-sectional view showing the main portion of yet another electrically driven expansion valve.

Furthermore, FIG. 7 shows yet another electrically driven expansion valve (Z). The electrically driven expansion valve (Z) is directed to preventing sludge from being attached to the narrow outer circumferential gap (21) formed between the outer circumferential wall of the case (3) and the outer circumferential surface of the permanent magnet (4) positioned in the outermost circumference of the rotor (10) and closely opposed to the outer circumferential wall, instead of using the means (Q) for lowering the flow rate of the refrigerant of FIG. 6. For this purpose, a refrigerant passage (46) that is means (R) for lowering the flow rate of the refrigerant in the outer circumferential gap (21) is provided.

More specifically, the refrigerant passage (46) penetrating the permanent magnet (4) in the shaft direction in the circumferential wall portion thereof is formed so that the refrigerant passage (46) communicates between the first space (31) and the second space (32).

According to such an embodiment, when the refrigerant flows from the first space (31) to the second space (32) by the differential pressure between the refrigerant passage (9) side and the internal space (30) side, the passage resistance of the refrigerant passage (46) is smaller than that of the outer circumferential gap (21), so that most of the refrigerant flows through the refrigerant passage (46) and the refrigerant flowing through the outer circumferential gap (21) is decreased relatively.

As a result, even if a refrigerant or a refrigerating machine oil that allows generation of sludge in a large amount is used, a relative decrease of the refrigerant flow rate flowing through the outer circumferential gap (21) reduces the amount of sludge attached to the wall surface of the circumferential gap (21), that is, the inner circumferential surface of the case (3) and the outer circumferential surface of the permanent magnet (4) by the decrease of the flow rate of the refrigerant. Therefore, interference of the operation of the rotor (10) due to sludge attachment to the outer circumferential gap (21) can be prevented as much as possible, and a proper operation of the needle (2) can be ensured. As a result, for example, abnormal liquid compression or superheat in the compressor (121) can be prevented, and the reliability in terms of the operation of the refrigerating apparatus (100) can be obtained. The configuration other than that, the functions and the effects are the same as those of the electrically driven expansion valve (Z) of FIG. 6.

The present invention may be provided with a refrigerant circuit (110) including two direct drive type electrically driven expansion valves (Z) arranged in series, in addition to the refrigerant circuit (110) including one direct drive type electrically driven expansion valves (Z) as shown in FIG. 1. In other words, the present invention may include the electrically driven expansion valve (Z) on the external side, and the electrically driven expansion valve (Z) on the internal side.

Furthermore, the present invention can be applied to a refrigerating apparatus (100) of a binary refrigerating cycle or a refrigerating apparatus (100) of a two-stage compression cycle, in addition to the pair air conditioner of FIG. 1 and the multi-air conditioner.

Industrial Applicability

As described above, the refrigerating apparatus of the present invention is useful for one employing the direct drive type electrically driven expansion valve, in particular, is suitable when a HFC refrigerant is used.

What is claimed is:

1. A refrigerating apparatus comprising a low pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant based on HFC is used, and a rating torque equivalent friction factor E of the direct drive type electrically driven expansion valve (Z) is set to 0.31 or more and less than 0.62.

2. A refrigerating apparatus comprising a high pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant having a discharge temperature in a same level as that of R22 or higher is used, and a rating torque equivalent friction factor E of the direct drive type electrically driven expansion valve (Z) is set to 0.34 or more and less than 0.68.

3. A refrigerating apparatus comprising a high pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant of R32 alone or a R32 rich mixture comprising an amount of more than 50 wt % of R32 is used, and a rating torque equivalent friction factor E of the direct drive type electrically driven expansion valve (Z) is set to 0.37 or more and less than 0.74.

4. A refrigerating apparatus comprising a high pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a R32 rich mixture refrigerant having a discharge temperature of more than about 10° C. higher than that of R22 is used, and a rating torque equivalent friction factor E of the direct drive type electrically driven expansion valve (Z) is set to 0.37 or more and less than 0.74.

5. A refrigerating apparatus comprising a high pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant based on HFC is used, and a rating torque equivalent friction factor E of the direct drive type electrically driven expansion valve (Z) is set to 0.37 or more and less than 0.74.

6. A refrigerating apparatus comprising a low pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant based on HFC is used, and a rating torque equivalent friction factor E of the direct drive type electrically driven expansion valve (Z) is set to 0.62 or more and less than 0.93.

7. A refrigerating apparatus comprising a high pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant having a discharge temperature in a same level as that of R22 or higher is used, and a rating torque equivalent friction factor E of the direct drive type electrically driven expansion valve (Z) is set to 0.68 or more and less than 1.02.

8. A refrigerating apparatus comprising a high pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant of R32 alone or a R32 rich mixture comprising an amount of more than 50 wt % of R32 is used, and a rating torque equivalent friction factor E of the direct drive type electrically driven expansion valve (Z) is set to 0.74 or more and less than 1.11.

9. A refrigerating apparatus comprising a high pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a R32 rich mixture refrigerant having a discharge temperature of more than about 10° C. higher than that of R22 is used, and a rating torque equivalent friction factor E of the direct drive type electrically driven expansion valve (Z) is set to 0.74 or more and less than 1.11.

10. A refrigerating apparatus comprising a high pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant based on HFC is used, and a rating torque equivalent friction factor E of the direct drive type electrically driven expansion valve (Z) is set to 0.74 or more and less than 1.11.

11. A refrigerating apparatus comprising a low pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant based on HFC is used, and a rating torque equivalent friction factor E of the direct drive type electrically driven expansion valve (Z) is set to 0.93 or more.

12. A refrigerating apparatus comprising a high pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant having a discharge temperature in a same level as that of R22 or higher is used, and a rating torque equivalent friction factor E of the direct drive type electrically driven expansion valve (Z) is set to 1.02 or more.

13. A refrigerating apparatus comprising a high pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant of R32 alone or a R32 rich mixture comprising an amount of more than 50 wt % of R32 is used, and a rating torque equivalent friction factor E of the direct drive type electrically driven expansion valve (Z) is set to 1.11 or more.

14. A refrigerating apparatus comprising a high pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a R32 rich mixture refrigerant having a discharge temperature of more than about 10° C. higher than that of R22 is used, and a rating torque equivalent friction factor E of the direct drive type electrically driven expansion valve (Z) is set to 1.11 or more.

15. A refrigerating apparatus comprising a high pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant based on HFC is used, and a rating torque equivalent friction factor E of the direct drive type electrically driven expansion valve (Z) is set to 1.11 or more.

16. A refrigerating apparatus comprising a low pressure dome type compressor (121), a direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers, wherein a refrigerant based on HFC is used, and a rating torque equivalent friction factor E of the direct drive type electrically driven expansion valve (Z) is set to 0.33 or more and less than 0.66.

17. A refrigerating apparatus comprising a high pressure dome type compressor (121), a direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers, wherein a refrigerant having a discharge temperature in a same level as that of R22 or higher is used, and a rating torque equivalent friction factor E of the direct drive type electrically driven expansion valve (Z) is set to 0.40 or more and less than 0.80.

18. A refrigerating apparatus comprising a high pressure dome type compressor (121), a direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers, wherein a refrigerant of R32 alone or a R32 rich mixture comprising an amount of more than 50 wt % of R32 is used, and a rating torque equivalent friction factor E of the direct drive type electrically driven expansion valve (Z) is set to 0.47 or more and less than 0.94.

19. A refrigerating apparatus comprising a high pressure dome type compressor (121), the direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers, wherein a R32 rich mixture refrigerant having a discharge temperature of more than about 10° C. higher than that of R22 is used, and a rating torque equivalent friction factor E of the direct drive type electrically driven expansion valve (Z) is set to 0.47 or more and less than 0.94.

20. A refrigerating apparatus comprising a high pressure dome type compressor (121), a direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers,
  wherein a refrigerant based on HFC is used, and
  a rating torque equivalent friction factor E of the direct drive type electrically driven expansion valve (Z) is set to 0.47 or more and less than 0.94.

21. A refrigerating apparatus comprising a low pressure dome type compressor (121), a direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers,
  wherein a refrigerant based on HFC is used, and
  a rating torque equivalent friction factor E of the direct drive type electrically driven expansion valve (Z) is set to 0.66 or more and less than 0.99.

22. A refrigerating apparatus comprising a high pressure dome type compressor (121), a direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers,
  wherein a refrigerant having a discharge temperature in a same level as that of R22 or higher is used, and
  a rating torque equivalent friction factor E of the direct drive type electrically driven expansion valve (Z) is set to 0.80 or more and less than 1.20.

23. A refrigerating apparatus comprising a high pressure dome type compressor (121), a direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers,
  wherein a refrigerant of R32 alone or a R32 rich mixture comprising an amount of more than 50 wt % of R32 is used, and
  a rating torque equivalent friction factor E of the direct drive type electrically driven expansion valve (Z) is set to 0.94 or more and less than 1.41.

24. A refrigerating apparatus comprising a high pressure dome type compressor (121), the direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers,
  wherein a R32 rich mixture refrigerant having a discharge temperature of more than about 10° C. higher than that of R22 is used, and
  a rating torque equivalent friction factor E of the direct drive type electrically driven expansion valve (Z) is set to 0.94 or more and less than 1.41.

25. A refrigerating apparatus comprising a high pressure dome type compressor (121), a direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers,
  wherein a refrigerant based on HFC is used, and
  a rating torque equivalent friction factor E of the direct drive type electrically driven expansion valve (Z) is set to 0.94 or more and less than 1.41.

26. A refrigerating apparatus comprising a low pressure dome type compressor (121), a direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers,
  wherein a refrigerant based on HFC is used, and
  a rating torque equivalent friction factor E of the direct drive type electrically driven expansion valve (Z) is set to 0.99 or more.

27. A refrigerating apparatus comprising a high pressure dome type compressor (121), a direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers,
  wherein a refrigerant having a discharge temperature in a same level as that of R22 or higher is used, and
  a rating torque equivalent friction factor E of the direct drive type electrically driven expansion valve (Z) is set to 1.20 or more.

28. A refrigerating apparatus comprising a high pressure dome type compressor (121), a direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers,
  wherein a refrigerant of R32 alone or a R32 rich mixture comprising an amount of more than 50 wt % of R32 is used, and
  a rating torque equivalent friction factor E of the direct drive type electrically driven expansion valve (Z) is set to 1.41 or more.

29. A refrigerating apparatus comprising a high pressure dome type compressor (121), the direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers,
  wherein a R32 rich mixture refrigerant having a discharge temperature of more than about 10° C. higher than that of R22 is used, and
  a rating torque equivalent friction factor E of the direct drive type electrically driven expansion valve (Z) is set to 1.41 or more.

30. A refrigerating apparatus comprising a high pressure dome type compressor (121), a direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers,
  wherein a refrigerant based on HFC is used, and
  a rating torque equivalent friction factor E of the direct drive type electrically driven expansion valve (Z) is set to 1.41 or more.

31. A refrigerator apparatus comprising a compressor (121), a heat source side head exchanger (123), a direct drive type electrically driven expansion valve (Z), and a heat application side heat exchanger (131), wherein a friction factor E on a thread surface at a rating torque of the direct drive type electrically driven expansion valve (Z) is set to 0.62 or more.

32. A refrigerating apparatus comprising a low pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant based on hydrocarbon is used, and a rating torque equivalent friction factor E of the direct drive type electrically driven expansion valve (Z) is set to 0.31 or more and less than 0.62.

33. A refrigerating apparatus comprising a high pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant based on hydrocarbon is used, and a rating torque equivalent friction factor E of the direct drive type electrically driven expansion valve (Z) is set to 0.34 or more and less than 0.68.

34. A refrigerating apparatus comprising a low pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant based on hydrocarbon is used, and a rating torque equivalent friction factor E of the direct drive type electrically driven expansion valve (Z) is set to 0.62 or more and less than 0.93.

35. A refrigerating apparatus comprising a high pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant based on hydrocarbon is used, and a rating torque equivalent friction factor E of the direct drive type electrically driven expansion valve (Z) is set to 0.68 or more and less than 1.02.

36. A refrigerating apparatus comprising a low pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant based on hydrocarbon is used, and a rating torque equivalent friction factor E of the direct drive type electrically driven expansion valve (Z) is set to 0.93 or more.

37. A refrigerating apparatus comprising a high pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant based on hydrocarbon is used, and a rating torque equivalent friction factor E of the direct drive type electrically driven expansion valve (Z) is set to 1.02 or more.

38. A refrigerating apparatus comprising a low pressure dome type compressor (121), a direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers, wherein a refrigerant based on hydrocarbon is used, and a rating torque equivalent friction factor E of the direct drive type electrically driven expansion valve (Z) is set to 0.33 or more and less than 0.66.

39. A refrigerating apparatus comprising a high pressure dome type compressor (121), a direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers, wherein a refrigerant based on hydrocarbon is used, and a rating torque equivalent friction factor E of the direct drive type electrically driven expansion valve (Z) is set to 0.40 or more and less than 0.80.

40. A refrigerating apparatus comprising a low pressure dome type compressor (121), a direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers, wherein a refrigerant based on hydrocarbon is used, and a rating torque equivalent friction factor E of the direct drive type electrically driven expansion valve (Z) is set to 0.66 or more and less than 0.99.

41. A refrigerating apparatus comprising a high pressure dome type compressor (121), a direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers, wherein a refrigerant based on hydrocarbon is used, and a rating torque equivalent friction factor E of the direct drive type electrically driven expansion valve (Z) is set to 0.80 or more and less than 1.20.

42. A refrigerating apparatus comprising a low pressure dome type compressor (121), a direct drive type electrically driven expansion valve (Z), a heat source side heat exchanger (123) and a heat application side heat exchanger (131), the heat source side heat exchanger (123) and the heat application side heat exchanger (131) corresponding to each other one-to-one, wherein a refrigerant based on hydrocarbon is used, and a rating torque equivalent friction factor E of the direct drive type electrically driven expansion valve (Z) is set to 0.99 or more.

43. A refrigerating apparatus comprising a high pressure dome type compressor (121), a direct drive type electrically driven expansion valve (Z), a heat source side heat exchanger (123) and a heat application side heat exchanger (131), one or both of the heat source side heat exchanger (123) and the heat application side heat exchanger (131) being constituted by a plurality of heat exchangers, wherein a refrigerant based on hydrocarbon is used, and a rating torque equivalent friction factor E of the direct drive type electrically driven expansion valve (Z) is set to 1.20 or more.

44. The refrigerating apparatus of claim 1 wherein the refrigerant is R134a.

45. The refrigerating apparatus of claim 1 wherein the refrigerant is R407C.

46. The refrigerating apparatus of claim 1 wherein the refrigerant is R410A.

47. The refrigerating apparatus of claim 1 wherein the refrigerant is R404A or R507A.

48. The refrigerating apparatus of claim 4 wherein the refrigerant is any one of R32/125 (P32 is at least 70%), R32/134a (R32 is at least 50%), R32/propane (R32 is at least 80%), R32/butane (R32 is at least 80%), and R32/isobutane (R32 is at least 80%).

49. The refrigerating apparatus of claim 1 which utilizes an existing pipe.

50. The refrigerating apparatus of claim 1 which comprises a refrigerating machine oil based on polyvinyl ether.

51. The refrigerating apparatus of claim 1 which comprises a refrigerating machine oil based on polyol ester.

52. The refrigerating apparatus of claim 1 which comprises a refrigerating machine oil based on carbonic acid ester.

53. The refrigerating apparatus of claim 1 which comprises a refrigerating machine oil based on alkylbenzene.

54. The refrigerating apparatus of claim 1 which comprises a refrigerating machine oil based on mineral oil.

55. The refrigerating apparatus of claim 1 which comprises a refrigerating machine oil based on polyvinyl ether, polyol ester or carbonic acid ester and mixed with alkylbenzene or mineral oil.

56. The refrigerating apparatus of claim 50 wherein an extreme-pressure additive concentration in the refrigerating machine oil is 0.3 or more and 1% by weight or less (refrigerating machine oil weight ratio).

57. The refrigerating apparatus of claim 1 wherein the compressor (121) is a swing type compressor.

58. The refrigerating apparatus of claim 1 wherein the direct drive type electrically driven expansion valve (Z) comprises: a valve body (1) including a needle (2), an insert hole (16) of the needle (2), and a refrigerant passage (9) that positioned on one end of the insert hole (16) and whose passage area is adjusted by the needle (2), a case (3) that is attached to the valve body (1) so that the other side of the insert hole (16) is enclosed in an internal space (30), and includes at least a part of electrically driven means (X) for driving the needle (2) in the internal space (30), and flow-rate lowering means (P) for lowering a flow rate of a refrigerant flowing from the refrigerant passage (9) to the internal space (30) through an insert gap (17) formed between the insert hole (16) and the needle (2).

59. The refrigerating apparatus of claim 1 wherein the direct drive type electrically driven expansion valve (Z) comprises: a valve body (1) including a needle (2), an insert hole (16) of the needle (2), and a refrigerant passage (9) that positioned on one end of the insert hole (16) and whose passage area is adjusted by the needle (2), a case (3) that is attached to the valve body (1) so that the other side of the insert hole (16) is enclosed in an internal space (30), and includes at least a part of electrically driven means (X) for driving the needle (2) in the internal space (30), the electrically driven means (X) having a thread portion that is threaded outside the insert hole (16) and extends in a shaft direction of the insert hole (16), a thread gap (23) in communication with the insert hole (16) on the other side of the insert hole (16), and flow-rate lowering means (Q) for lowering a flow rate of a refrigerant flowing from the refrigerant passage (9) to the thread gap (23) through the insert hole (16).

60. The refrigerating apparatus of claim 1 wherein the direct drive type electrically driven expansion valve (Z) comprises:

a valve body (1) including a needle (2), an insert hole (16) of the needle (2), and a refrigerant passage (9) that positioned on one end of the insert hole (16) and whose passage area is adjusted by the needle (2), a case (3) that is attached to the valve body (1) so that the other side of the insert hole (16) is enclosed in an internal space (30), and includes at least a part of electrically driven means (X) for driving the needle (2) in the internal space (30), an outer circumferential gap (21) formed between an outer circumferential surface of the electrically driven means (X) and an inner circumferential surface of the case (3), and flow-rate lowering means (R) for lowering a flow rate of a refrigerant flowing between a first space (31) positioned on one side of the electrically driven means (X) in the inner space (30) and a second space (32) positioned on the other side thereof through the outer circumferential gap (21).

61. The refrigerating apparatus of claim 1 wherein a mixed refrigerant of R32 alone or R32 rich mixture comprising an amount of more than 50 wt % of R32 is used, and a permanent magnet (4) of a driving motor (X) of the direct drive type electrically driven expansion valve (Z) is a ferrite magnet.

62. The refrigerating apparatus of claim 1 wherein a permanent magnet (4) of a driving motor (X) of the direct drive type electrically driven expansion valve (Z) is a rare earth magnet.

63. The refrigerating apparatus of claim 1 wherein a permanent magnet (4) of a driving motor (X) of the direct drive type electrically driven expansion valve (Z) is a rare earth magnet having a demagnetization temperature of 1 30° C. or more.

64. The refrigerating apparatus of claim 1 wherein a mixed refrigerant of R32 alone or R32 rich mixture comprising an amount of more than 50 wt % of R32 is used, and a permanent magnet (4) of a driving motor (X) of the direct drive type electrically driven expansion valve (Z) is a rare earth magnet having a demagnetization temperature of 130° C. or more.

65. The refrigerating apparatus of claim 1 wherein a permanent magnet (4) of a driving motor (X) of the direct drive type electrically driven expansion valve (Z) is formed of an anisotropic magnetic material.

66. The refrigerating apparatus of claim 1 wherein a thread surface of the direct drive type electrically driven expansion valve (Z) is coated with a fluorine resin.

67. The refrigerating apparatus of claim 1 wherein a solid lubricant is applied onto a thread surface of the direct drive type electrically driven expansion valve (Z).

68. The refrigerating apparatus of claim 1 comprising a refrigerant circuit (110) including two direct drive type electrically driven expansion valves (Z) arranged in series.

69. The refrigerating apparatus of claim 1 comprising a refrigerant circuit (110) including one direct drive type electrically driven expansion valve (Z).

70. The refrigerating apparatus of claim 32 which utilizes an existing pipe.

71. The refrigerating apparatus of claim 32 which comprises a refrigerating machine oil based on alkylbenzene.

72. The refrigerating apparatus of claim 32 which comprises a refrigerating machine oil based on mineral oil.

73. The refrigerating apparatus of 72 wherein an extreme-pressure additive concentration in the refrigerating machine oil is 0.3 or more and 1% by weight or less (refrigerating machine oil weight ratio).

74. The refrigerating apparatus of claim 32 wherein the compressor (121) is a swing type compressor.

75. The refrigerating apparatus of claim 32 wherein the direct drive type electrically driven expansion valve (Z) comprises:
a valve body (1) including a needle (2), an insert hole (16) of the needle (2), and a refrigerant passage (9) that positioned on one end of the insert hole (16) and whose passage area is adjusted by the needle (2),
a case (3) that is attached to the valve body (1) so that the other side of the insert hole (16) is enclosed in an internal space (30), and includes at least a part of electrically driven means (X) for driving the needle (2) in the internal space (30), and
flow-rate lowering means (P) for lowering a flow rate of a refrigerant flowing from the refrigerant passage (9) to the internal space (30) through an insert gap (17) formed between the insert hole (16) and the needle (2).

76. The refrigerating apparatus of claim 32 wherein the direct drive type electrically driven expansion valve (Z) comprises:
a valve body (1) including a needle (2), an insert hole (16) of the needle (2), and a refrigerant passage (9) that positioned on one end of the insert hole (16) and whose passage area is adjusted by the needle (2),
a case (3) that is attached to the valve body (1) so that the other side of the insert hole (16) is enclosed in an internal space (30), and includes at least a part of electrically driven means (X) for driving the needle (2) in the internal space (30), the electrically driven means (X) having a thread portion that is threaded outside the insert hole (16) and extends in a shaft direction of the insert hole (16),
a thread gap (23) in communication with the insert hole (16) on the other side of the insert hole (16), and
flow-rate lowering means (Q) for lowering a flow rate of a refrigerant flowing from the refrigerant passage (9) to the thread gap (23) through the insert hole (16).

77. The refrigerating apparatus of claim 32 wherein the direct drive type electrically driven expansion valve (Z) comprises:
a valve body (1) including a needle (2), an insert hole (16) of the needle (2), and a refrigerant passage (9) that positioned on one end of the insert hole (16) and whose passage area is adjusted by the needle (2),
a case (3) that is attached to the valve body (1) so that the other side of the insert hole (16) is enclosed in an internal space (30), and includes at least a part of electrically driven means (X) for driving the needle (2) in the internal space (30),
an outer circumferential gap (21) formed between an outer circumferential surface of the electrically driven means (X) and an inner circumferential surface of the case (3), and
flow-rate lowering means (R) for lowering a flow rate of a refrigerant flowing between a first space (31) positioned on one side of the electrically driven means (X) in the inner space (30) and a second space (32) positioned on the other side thereof through outer circumferential gap (21).

78. The refrigerating apparatus of claim 32 wherein a permanent magnet (4) of a driving motor (X) of the direct drive type electrically driven expansion valve (Z) is a ferrite magnet.

79. The refrigerating apparatus of claim 32 wherein a permanent magnet (4) of a driving motor (X) of the direct drive type electrically driven expansion valve (Z) is a rare earth magnet.

80. The refrigerating apparatus of claim 32 wherein a permanent magnet (4) of a driving motor (X) of the direct drive type electrically driven expansion valve (Z) is formed of an anisotropic magnetic material.

81. The refrigerating apparatus of claim 32 wherein a thread surface of the direct drive type electrically driven expansion valve (Z) is coated with a fluorine resin.

82. The refrigerating apparatus of claim 32 wherein a solid lubricant is applied onto a thread surface of the direct drive type electrically driven expansion valve (Z).

83. The refrigerating apparatus of claim 32 comprising a refrigerant circuit (110) including two direct drive type electrically driven expansion valves (Z) arranged in series.

84. The refrigerating apparatus of claim 32 comprising a refrigerant circuit (110) including one direct drive type electrically driven expansion valve (Z).

* * * * *